(12) United States Patent
Cutler

(10) Patent No.: US 7,330,566 B2
(45) Date of Patent: Feb. 12, 2008

(54) VIDEO-BASED GAIT RECOGNITION

(75) Inventor: Ross G. Cutler, Duvall, WA (US)

(73) Assignee: Microsoft Corporation, Redmond, WA (US)

( * ) Notice: Subject to any disclaimer, the term of this patent is extended or adjusted under 35 U.S.C. 154(b) by 640 days.

(21) Appl. No.: 10/611,657

(22) Filed: Jun. 30, 2003

(65) Prior Publication Data

US 2004/0228503 A1    Nov. 18, 2004

Related U.S. Application Data

(60) Provisional application No. 60/470,670, filed on May 15, 2003.

(51) Int. Cl.
*G06K 9/00* (2006.01)
(52) U.S. Cl. ..................... 382/103; 382/115
(58) Field of Classification Search ............... 382/103, 382/107, 203, 115, 190; 725/12, 9, 10, 19
See application file for complete search history.

(56) References Cited

U.S. PATENT DOCUMENTS

| | | | | |
|---|---|---|---|---|
| 6,816,603 | B2* | 11/2004 | David et al. ................. | 382/107 |
| 2002/0028003 | A1* | 3/2002 | Krebs et al. ................ | 382/115 |
| 2003/0161500 | A1* | 8/2003 | Blake et al. ................ | 382/103 |

OTHER PUBLICATIONS

R. Tsai, "An Efficient and Accurate Camera Calibration Technique for 3d Machine Vision," Proceedings of the Computer Vision and Pattern Recognition, 1986, pp. 364-374.

M. Turk and A. Pentland, "Face Recognition Using Eigenfaces," CVPR, 1991. pp. 586-591.

I. Haritaoglu, D. Harwood, and L.S. Davis, "W4S: A Real-Time System for Detecting and Tracking People in 2½ D," in European Conference on Computer Vision, 1998, 16 pages.

A. Elgammal, D. Harwood, and L.S. Davis, "Non-parametric Model for Background Subtraction," IEEE ICCV99 Frame Rate Workshop, IEEE 7th International Conference on Computer Vision, Kerkyra, Greece, Sep. 1999, pp. 1-17.

R. Cutler and L.S. Davis, "Robust Real-Time Periodic Motion Detection, Analysis, and Applications," IEEE Transactions on Pattern Analysis and Machine Intelligence (PAMI), vol. 22, No. 8, Aug. 2000, pp. 781-796.

C. BenAbdelkader, R. Cutler, H. Nanda, and L.S. Davis, "EigenGait: Motion-based Recognition of People Using Image Self-similarity," Proc. Intl. on Audio and Video-based Person Authentication (AVBPA), 2001, 11 pages.

C. BenAbdelkader, R. Cutler, and L.S. Davis, "Motion-based Recognition of People in Eigengait Space," 5th International Conference on Automatic Face and Gesture Recognition, May 20, 2002, pp. 1-6.

(Continued)

*Primary Examiner*—Samir Ahmed
*Assistant Examiner*—Claire X. Wang
(74) *Attorney, Agent, or Firm*—Lee & Hayes, PLLC

(57) ABSTRACT

Described herein is a method for identifying an ambulatory subject based on video analysis of the subject's gait. The method includes: acquiring a sequence of images that collectively captures the gait of the subject; determining a collection of features from the sequence of images representative of the gait; and identifying the subject based on the features. In one exemplary implementation, the subject is identified based on the features of cadence, stride length, and height parameters.

20 Claims, 20 Drawing Sheets

OTHER PUBLICATIONS

C. BenAbdelkader, R. Cutler, and L.S. Davis, "Stride and Cadence as a Biometric in Automatic Person Identification and Verification," 5th International Conference on Automatic Face and Gesture Recognition, May 20, 2002, pp. 1-6.

C. BenAbdelkader, R. Cutler, and L.S. Davis, "View-invariant Estimation of Height and Stride for Gait Recognition," Workshop on Biometric Authentication (BIOMET), in association with ECCV 2002, Jun. 1, 2002, 12 pages.

C. BenAbdelkader, R. Cutler, and L.S. Davis, "Person Identification Using Automatic Height and Stride Estimation," IEEE International Conference on Pattern Recognition, Aug. 11, 2002-Aug. 15, 2002, pp. 1-4.

C. BenAbdelkader, R. Cutler, and L.S. Davis, "Combining Holistic and Parametric Approaches for Gait Recognition," Submitted to IEEE Transactions on Pattern Analysis and Machine Intelligence, Dec. 2002, 37 pages.

* cited by examiner

VIDEO-BASED GAIT RECOGNITION

This application claims the benefit of Provisional Application No. 60/470,670, filed on May 15, 2003, which is incorporated herein by reference in its entirety.

TECHNICAL FIELD

This invention relates to the analysis of the motion of a human subject, and, in a more particular implementation, to the analysis of the gait of the human subject based on video data, and the use of the analyzed gait to identify the human subject.

BACKGROUND

Gait refers to a person's walking style (that is, the "way" the person walks). There is strong evidence from psychophysical experiments and gait analysis research (a multidisciplinary field that spans kinesiology, physiotherapy, orthopedic surgery, ergonomics, etc.) that gait dynamics contain a signature that is characteristic of, and possibly unique to, each individual. More specifically, from a biomechanics standpoint, human gait consists of synchronized, integrated movements of hundreds of muscles and joints of the body. These movements follow the same basic bipedal pattern for all humans, and yet vary from one individual to another in certain details (such as their relative timing and magnitudes) as a function of their entire musculo-skeletal structure, e.g., body mass, limb lengths, bone structure, etc. Because this structure is difficult to replicate, gait is believed to be unique to each individual and can be characterized by a few hundred kinematic parameters, namely the angular velocities and accelerations at certain joints and body landmarks.

Various techniques have been proposed for automatically analyzing a person's gait for use in different applications. One such application is gait recognition. In the computer vision community, gait recognition refers to the task of automatically extracting visual cues that characterize the motion of a walking person from video images of the walking person, and using these cues to potentially identify the person. Gait is an attractive biometric for automated recognition, particularly for passive surveillance applications, due to the ability to determine this biometric "at a distance," that is, without the need to interact with the subject, or even obtain the cooperation of the subject. Gait is also a biometric that may be difficult to conceal.

Existing automated approaches to analyzing human gait can be categorized as either model-based or holistic. Model-based approaches use a model of either the person's shape (e.g., structure) or motion in order to recover features of gait mechanics, such as stride dimensions and kinematics of joint angles. In holistic techniques, gait is characterized by the statistics of the spatiotemporal patterns generated by the silhouette of the walking person in the image. That is, holistic techniques compute a set of features (the gait signature) from these patterns, and then use these features to classify gait. Some studies have required the subject to wear special instruments (such as LED markers), or walk on special surfaces. Other studies have attempted to characterize a person's gait without any such artificial cues and assumptions.

While the above-identified techniques have shown promise in identifying individuals based on their gait, there remains room for significant improvement in this field. More specifically, because of the complexity of human locomotion, it is not an intuitive matter what collection of parameters associated with a subject's ambulatory motion can best be used to characterize the subject's unique gait. It is likewise a non-routine task to provide a reliable technique for extracting identified parameters from video data. Various real-world conditions may further compound these challenges, such as the possibility that various factors may impact the subject's gait behavior in ways that may be difficult to predict (including factors of fatigue of the subject, mood of the subject, sickness of the subject, footwear used by the subject, and so on), the possibility that environmental conditions may degrade the quality of the captured images, the possibility that the subject's apparel may obscure the gait behavior, the possibility that the video itself may be of relatively low resolution, and so on. These factors may result in gait analysis results that have a considerable degree of error.

As such, there is an exemplary need in the art to provide motion-based biometric analysis having improved accuracy, reliability, utility, and/or efficiency compared to known techniques.

SUMMARY

Described herein is a method for identifying an ambulatory subject based on video analysis of the subject's gait. The method includes: acquiring a sequence of images that collectively captures the gait of the subject; determining a collection of features from the sequence of images representative of the gait; and identifying the subject based on the determined features. In one exemplary implementation, the subject is identified based on the features of cadence, stride length, and height parameters (where the height parameters model a dynamically varying ambulatory subject height).

A related apparatus is also described herein.

Figure 1:
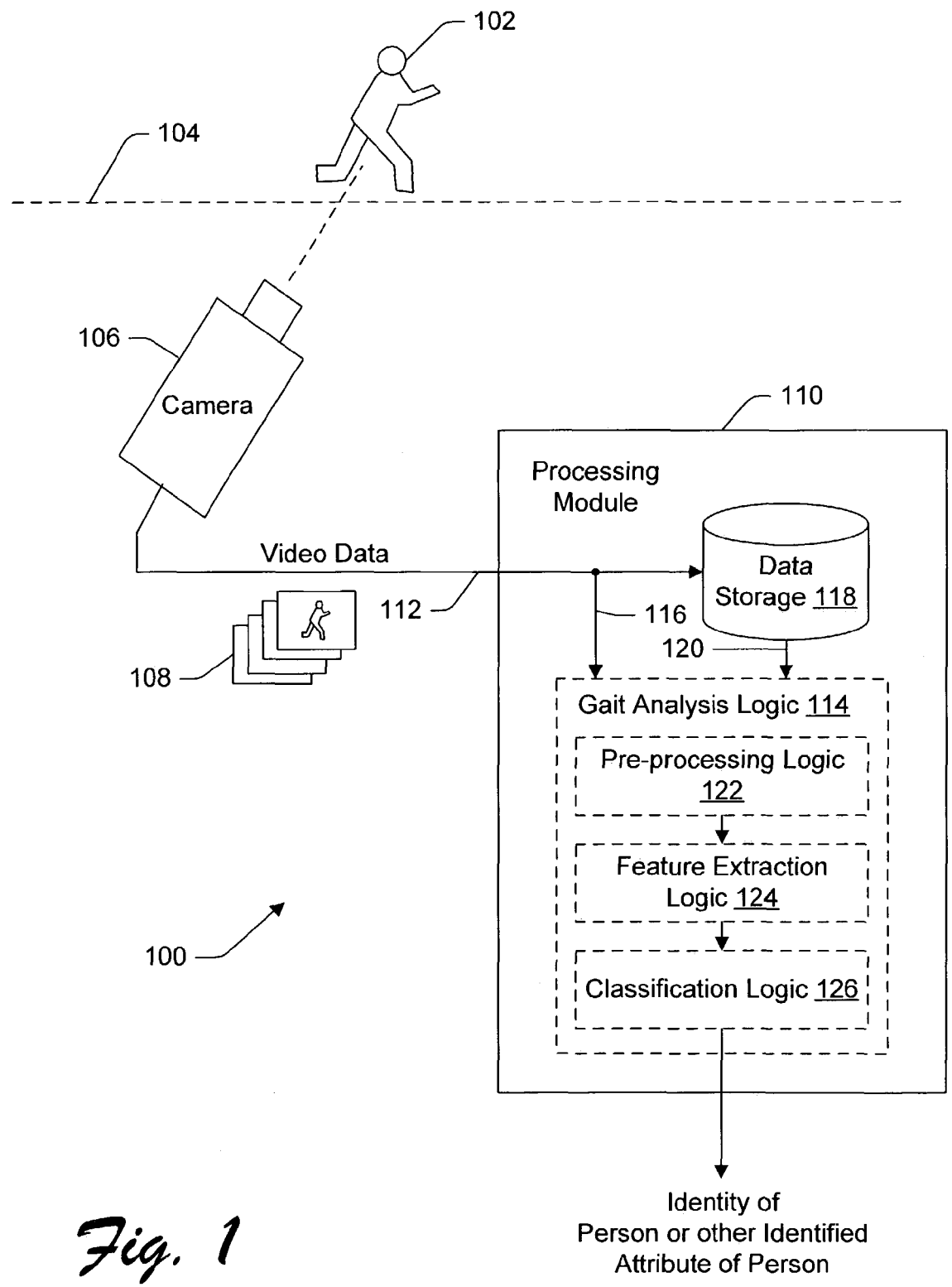
FIG. 1 shows an overview of an exemplary system for analyzing the gait of a human subject and identifying the human subject in response thereto.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

A. System Overview

A technique and related system are described herein for analyzing a motion-based biometric of a human subject, and for identifying the human subject based on the motion-based biometric. In the implementation described below, the motion-based biometric pertains to the gait of the human subject. The gait of the subject loosely refers to the way that the subject walks, which, in turn, may be based on a host of physiological parameters. The subject's gait may be unique to the subject, and in any event, has the potential of discriminating the subject from a group of other subjects having their own respective distinctive gaits.

The phrase "identifying the gait" has broad connotation as used here. In one case, the term "identifying" may refer to determining the identity of the walking subject (that is, determining who the walking subject is). In another case, the term "identifying" may refer to determining some characteristic of the walking subject based on their gait besides their identity.

The identification technique described here likewise has broad application to different fields. In one case, the technique can be used for video surveillance. For instance, the technique can be used to determine the identity of individuals by comparing these individuals' walking styles with prior stored knowledge regarding their respective walking styles. This determination can be used to detect the presence of authorized or unauthorized persons in a defined area (such as a building, courtyard, etc.), to pick out a particular subject of interest in a group of other individuals, to track such a subject of interest throughout the day, and so on. The camera used for these applications can comprise a conventional video camera (either fixed or moving, analog or digital), telescopic type image acquisition devices (for observing subjects at a relatively great distance), satellite imaging acquisition devices, and so on.

In another application, the identification technique can be used to perform indexing of video frames for use in video playback or video editing. For instance, this technique can be used to find the beginning of a scene that included a specified ambulatory subject, etc. This technique could also serve as a video retrieval strategy. That is, the technique can be used for retrieving an identified video resource containing a specified ambulatory subject from an archive of video resources.

In another application, the identification technique can be used for various kinds of man-machine interfaces. For instance, the technique can be used to determine the behavior of a subject that is interacting with a system (whether knowingly or unwittingly). For instance, an exemplary application of this type can determine the identity of an individual approaching or moving away from a system based on their gait. This analysis can be used to open or lock a door or gait based on an assessment of the identity of the subject, provide various resources (such as activating an account associated with an approaching subject), or take any other actions depending on the context of the particular application.

In another application, the identification technique can also be used to provide information regarding the characteristics of the subject's gait. For instance, the technique can be used to identify various abnormalities in the subject's gait, potentially suggesting injury, sickness, or simply the formation of poor behavioral habits. The identification technique can also be used to assess the ambulatory performance of the subject, such as by providing assessment of sports-related performance, arts-related performance (e.g., dance performance), efficiency-related work performance, and so on.

The technique can be applied to still additional environments, as will be apparent to those skilled in the art.

FIG. 1 shows an overview of an exemplary system 100 for analyzing the gait of a human subject 102 (henceforth "subject") and identifying the subject 102 in response thereto. The subject's 102 movement over a surface defines a path 104. The path 104 can represent a course over a flat surface, over an inclined surface, or generally over an uneven surface. In any case, it is assumed herein that the subject 102 is walking in an upright position in a natural fashion. Further, in one exemplary and non-limiting implementation, it is assumed that the subject 102 is walking with an approximately constant velocity (e.g., in both speed and direction) for about 5-10 seconds (e.g., which may correspond to about 10-20 steps).

A camera 106 captures video data that describes the subject's 102 movement. The gait-analysis techniques described herein can accommodate different orientations of the camera 106 with respect to the subject 102. In one application, the axis formed by the direction that the camera 106 is pointed in (i.e., the optical axis) intersects the path 104 of the subject 102 at an approximately right angle. This orientation is referred to as a fronto-parallel orientation herein. Orientations which deviate from the fronto-parallel orientation to a significant degree are referred to as non-fronto-parallel orientations. In FIG. 1, the illustrated orientation of the camera 106 with respect to the subject 102 can be regarded as somewhat non-fronto-parallel, since the direction that the camera 106 is pointed in varies somewhat from the normal of the path 104.

Figure 2:
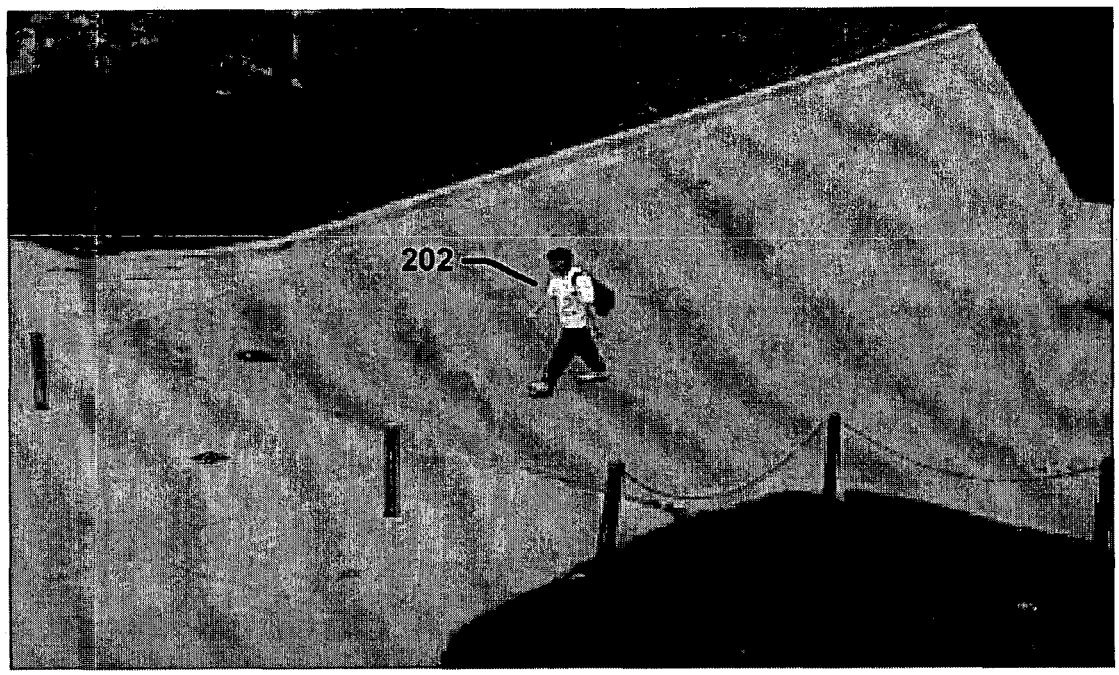
FIG. 2 shows a video image of a walking subject, where the subject is in a so-called fronto-parallel orientation with respect to a video camera.
Figure 3:
FIG. 3 shows a video image of a walking subject, where the subject is in a non-fronto-parallel orientation with respect to the video camera.

More specifically, jumping ahead briefly in the sequence of figures, FIG. 2 shows one example of a near fronto-parallel orientation of the camera 106 with respect to a subject 202, and FIG. 3 presents one example of a non-fronto-parallel orientation of the camera 106 with respect to a subject 302. As apparent from the examples shown in FIGS. 2 and 3, the camera 106 can be mounted at some elevated position with respect to the walking surface, but can also be located on a position below the walking surface, or on the walking surface. The camera 106 is preferably calibrated with respect to the ground plane (e.g., walking surface) that the subject 102 is traversing. The camera 106 can be stationary or can move (e.g., in a prescribed scan pattern). In the later case, logic can be used to process the output of the camera 106 to account for the movement of the camera 106.

Performance of gait analysis is typically optimal for the fronto-parallel orientation. But the techniques described herein also provide satisfactory results for non-fronto-parallel orientations. In the context of surveillance, it is desirable to make the gait analysis technique robust to different kinds of orientations of the camera 106 with respect to the subject 102, because the subject 102 is not under control of the entity conducting the surveillance, and therefore cannot be expected to tailor their walking so that it conforms to ideal image acquisition conditions.

Returning to FIG. 1, the camera 106 itself can comprise any kind of apparatus for capturing a sequence of images that define the movement of the subject 102. For instance, the camera 106 can comprise a conventional video camera. The camera 106 can capture video data 108 defining a series of video frames. Each of these video frames captures a snapshot of the subject's 102 motions at a particular juncture along the path 104. The camera 106 can originally capture digital video data, or, in an alternative implementation, can capture analog video data and then convert this analog data to digital form so that it can be suitably processed by digital processing devices. As mentioned above, the camera 106 can alternatively represent a telescopic image-acquisition device, a satellite acquisition device, or other kind of image acquisition device. In any case, in one exemplary application, the preferred frame rate of the camera 106 is greater than twice the walking frequency of the subject 102 (to be described in greater detail below). The camera 106 can provide video data having relatively low resolution, or video data having relatively high resolution (and, of course, any resolution level in between). For instance, in one illustrative case, the camera 106 provides image frames at 30 fps (frames per second) each with an image size of 360×240 pixels. In one exemplary implementation, the camera 106 can be configured to detect images in the visible portion of the electromagnetic spectrum. In other exemplary implementations, the camera 106 can be configured to detect images in other portions of the electromagnetic spectrum (such as the infrared portion), or using other imaging techniques.

A processing module 110 receives the video data 108 via coupling path 112. The coupling path 112 can represent a hardwired link or a wireless (e.g., radio) link between the camera 106 and processing module 110. That coupling path 112 can be formed as a point to point coupling path, or can be formed using any kind of network (Internet, intranet, LAN, etc.). Alternatively, the path 112 can loosely represent the manual transfer of video data via transportable media (e.g., magnetic or optical media, etc.).

The camera 106 can be located locally with respect to the processing module 110. Alternatively, the camera 112 can be positioned at a remote location with respect to the processing module 110. In still another case, the camera 106 can be integrated with the processing module 110; for example, a video camera can include integrated processing logic for performing analysis on the captured video, either in real time fashion, or upon playback of recorded video. The camera 106 and processing module 110 can be under the control of the same agent (e.g., controlling person or business entity), or can be under the control of different agents (such as when a first entity makes a video recording of a walking subject, and a second entity accesses this video recording and perform gait analysis on this video recording).

In any case, the processing module 110 can perform real-time or near real-time analysis of the subject's 102 gait in a real-time mode, as well as a non-real-time analysis in a non-real-time mode. In other words, in the real-time mode, the system 100 can be configured to immediately forward captured video data 108 to gait analysis logic 114 for immediate execution of gait analysis thereon. The real-time mode of operation is represented by path 116 that feeds video data from the camera 106 directly to the gait analysis logic 114. Alternatively, in the non-real-time mode, the system 100 can be configured to forward the video data 108 to a data storage 118. Then, at some later time, the processing module 110 can be configured to retrieve the video data 108 from the data storage 118 and forward it to the gait analysis logic 114 for performing analysis thereon. The non-real-time mode of operation is represented by path 120 in FIG. 1 that shows the video data 108 being forwarded from the data storage 118 to the gait analysis logic 114. The data storage 118 can represent a memory storage device that can be integrated with the gait analysis logic 114 (e.g., located in the same physical housing as the gait analysis logic 114), or can be located separate from the gait analysis logic 114 (e.g., as in the case where the data storage 118 is coupled to the gait analysis logic 114 via point-to-point connection or via network, etc.).

The processing module 110 itself can comprise any kind of processing functionality, including any kind of general purpose or special purpose computer, neural network, etc. To simply the explanation, it is assumed in the context of this discussion that the processing module 110 represents a computer. In this case, the computer can represent a standalone computer workstation, a server-type computer coupled to a network, or any other kind of computing device. Although not illustrated, such a computer can include conventional computer hardware, such as memory (ROM, RAM, magnetic discs, optical discs, etc.), one or more processing devices, one or more communication interfaces, one or more user input devices (keyboard, mouse device, etc.), one or more user output devices (display monitor, printer, etc.), and one or more buses for coupling its components together. Alternatively, as described above, the processing module 110 can represent logic functionality that is integrated with the camera 106, and, in this case, can represent computing hardware and software specifically tailored for its intended use in the camera 106.

However constituted, the memory (not shown) of the processing module 110 can include application logic for perform prescribed functions. Such application logic can take the form a series of machine instructions stored in memory for performing the ascribed functions. In the context of the present discussion, the application logic can include the above-mentioned gait analysis logic 114 for analyzing the sequence of frames in the video data 108, analyzing the gait-related behavior of the subject captured by the video data 108, and performing classification or discrimination functions based on the assessed gait-related behavior.

More specifically, the gait-related logic 114 can include a series of logic modules that perform individual subtasks within the general analysis task. Each of these modules can represent a collection of machine instructions for performing the module's ascribed subtask, such as a subroutine for performing the module's ascribed subtask.

Such modules can include preprocessing logic 122. The preprocessing logic 122 examines the video data 108 captured by the camera 106 and transforms the video data 108 into a form suitable for analysis by the remainder of the modules in the gait analysis logic 114. For instance, the preprocessing logic 122 can include logic for extracting the portions of the video frames that represent the walking subject 102 from a larger field of video information (e.g., representing the background in the image scene).

Feature extraction logic 124 extracts one or more parameters associated with gait from the preprocessing video data. If configured to operate in a parametric mode, the feature extraction logic 124 extracts one or more parameters based on a model (or multiple models) of the subject's 102 gait behavior. If configured to operate in a non-parametric (holistic) mode, the feature extraction logic 124 identifies features extracted from a spatiotemporal consideration of the video data itself, without necessarily making reference to an explicit theoretical model that describes gait behavior. In other words, the parametric analysis typically extracts targeted data from the video data 108 for analysis, whereas the holistic approach typically considers the video data 108 as a whole, thus deriving features based on an aggregative or statistical analysis of the gait behavior contained within the video data 108 as a whole. In still another application, the feature extraction logic 124 can combine aspects of both parametric and holistic approaches.

Classification logic 126 receives the features identified in the feature extraction logic 124 and determines some attribute of the subject 102 based on the extracted features. In one case, the classification logic 126 can compare the extracted features with previously encountered gait information corresponding to different individuals to determine the identity of a subject 102 under consideration. That is, in this application, the classification logic 126 can be used to match a "gait signature" of the subject under consideration with one or more gait signatures contained in a pool of such signatures stored in a classification knowledgebase. The classification logic 126 can also include functionality for training its discrimination functionality such that this functionality becomes progressively more accurate as additional video data is processed. One type of analysis technique that can be used to perform the above-identified tasks is the K nearest neighbor classification technique. Further, principal component analysis can be used to cull a salient grouping of information from the output of the feature extraction logic 124, and to present this salient grouping of information to the classification logic 126 instead of the original (e.g., raw) feature data generated by the feature extraction logic 124.

The following sections provide additional details regarding the three modules identified above, namely the preprocessing logic 122, the feature extraction logic 124, and the classification logic 126. More specifically, Section B describes a technique for recognizing subjects using a parametric approach based on the features of stride and cadence (to be defined below). Section C describes a technique for recognizing subjects using a parametric approach based on the features of stride, cadence and apparent height (where apparent height is measured as a dynamically changing parameter). Section D describes a technique for recognizing subjects using a holistic approach. Finally, Section E describes a technique for recognizing subjects using a combination of parametric and holistic approaches.

Figure 4:
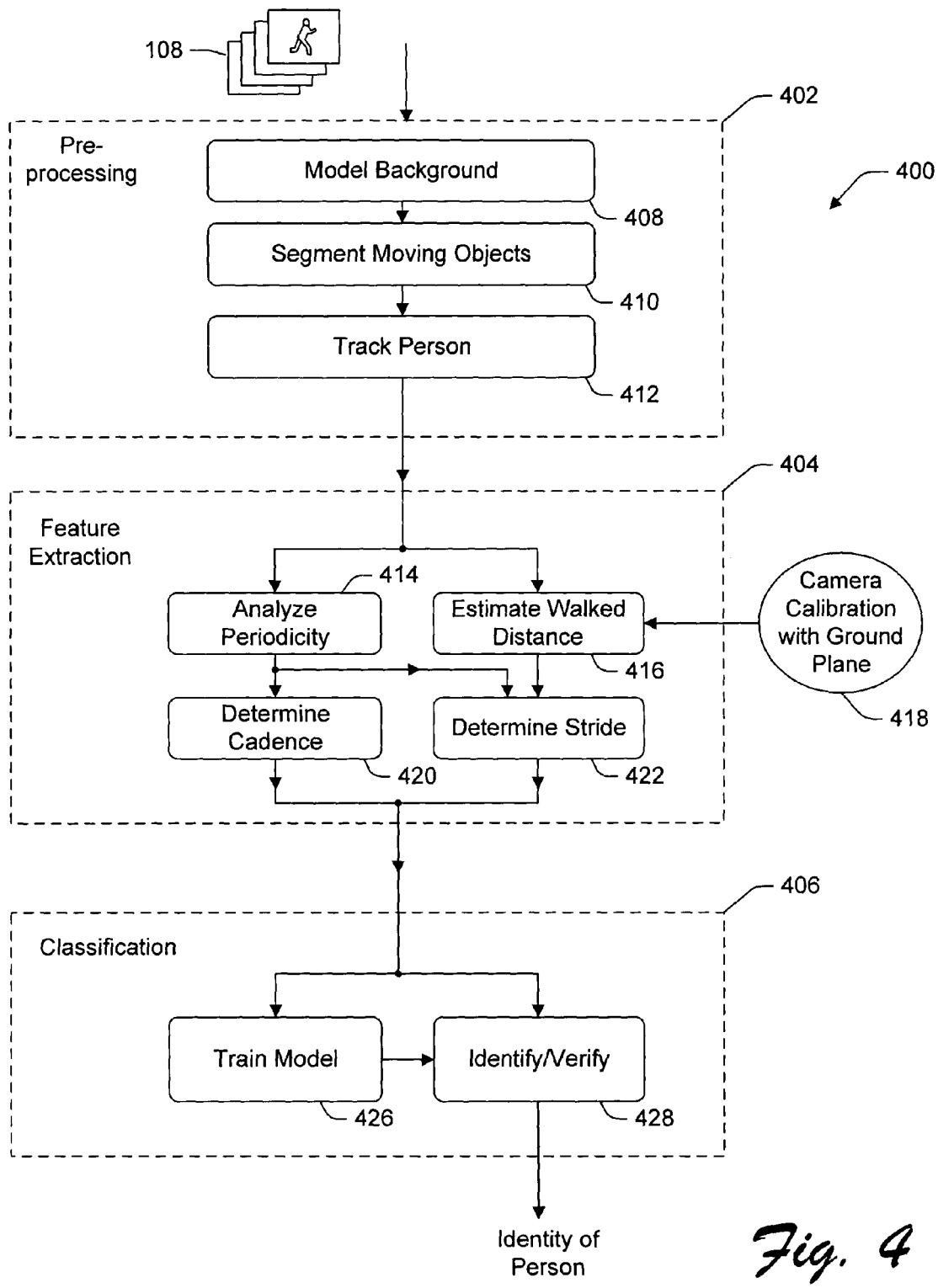
FIG. 4 shows an exemplary technique for identifying a subject based on the gait-related features of stride and cadence.

B. Technique for Recognizing Subjects Using Linearly-Related Parameters of Stride and Cadence FIG. 4 shows an exemplary method 400 for identifying the subject 102 based on the gait-related features of stride and cadence (to be defined below). The method 400 includes three general steps corresponding to the logic modules provided in the gait analysis logic 114 of FIG. 1. Namely, in a first general step 402, video data 108 is preprocessed to transform it into a form suitable for feature extraction. In the second general step 404, the transformed video data 108 is processed to extract stride and cadence parameters from the transformed data. In a third general step 406, the extracted features are used to classify the subject 102, or otherwise derive some attribute of the subject 102. Each of the above-described general steps will be described in further detail below.

The first general step, step 402, includes a first substep 408 that entails modeling background information in the video data 108, a second substep 410 that entails segmenting moving objects in the video data 108, and a third substep 412 that entails tracking the subject 102 within the video data 108.

More specifically, substeps 408 and 410 generally involve identifying background information in the scene represented by the video data 108 (such as information corresponding to the pavement, grass, and building shown in FIG. 3), identifying foreground information in the scene (such as the moving subject 302 shown in FIG. 3), and extracting the foreground information from the background information. Different known techniques are available for performing these tasks. In one exemplary implementation, a non-parametric background modeling technique is used to detect foreground information in the video data 108. This technique is robust to lighting changes, camera jitter, and to the presence of shadows. One such non-parametric technique is described in A. Elgammal, D. Harwood, and L. S. Davis, "Non-parametric Model for Background Subtraction," IEEE ICCV99 Frame Rate Workshop, IEEE $7^{th}$ International Conference on Computer Vision, Kerkyra, Greece, September 1999.

Figure 5:
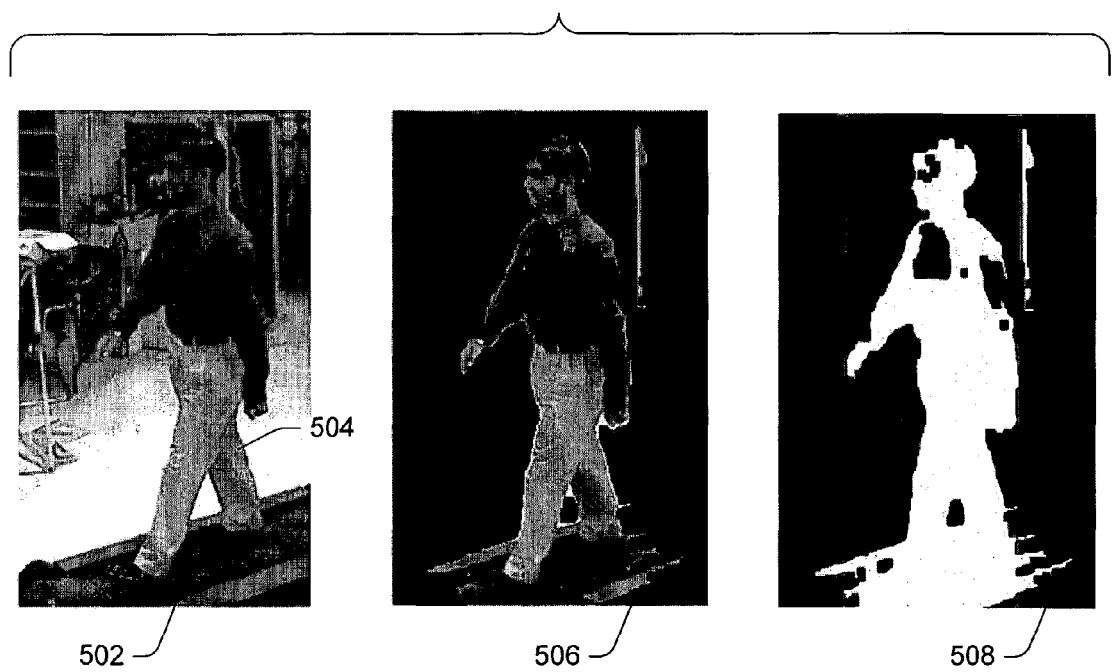
FIG. 5 shows three versions of a video image showing an ambulatory subject for use in explaining the extraction of foreground information from background information in the video image.

FIG. 5 shows an exemplary series of images that illustrate the operation of substeps 408 and 410. Namely, image 502 in FIG. 5 represents an original image containing a walking subject 504, where the camera defines a fronto-parallel orientation with respect to the subject 504. Image 506 shows a foreground template produced from the original image 502, which shows the subject 504, but omits the background information. Image 508 shows a binary template (also referred to as a binary silhouette herein) that shows the distinction between background and foreground information by presenting these regions in black and white, respectively (e.g., 1 and 0, respectively). Alternatively, the binary silhouette can be produced by presenting the background and foreground regions in white and black, respectively.

Once the subject 102 has been detected in a video frame, substep 412 comes into play by tracking the subject 102 in subsequent frames. Again, known techniques are available for performing this ascribed task. In one exemplary technique, binary silhouettes are tracked from frame to frame in the video data 108 using spatial and temporal coherence techniques. For instance, tracking can be performed in a simple case by linking overlapping binary silhouettes that appear in multiple respective frames. One exemplary technique that can be used is described in I. Haritaoglu, D. Harwood, and L. S. Davis, "W4s: A Real-Time System for Detecting and Tracking People in 2½ d," in European Conference on Computer Vision, 1998. A walking subject 102 can be discriminated from other potential foreground objects by excluding those foreground objects that are not moving at a pace that is typical of human locomotion (e.g., 80 to 145 steps per minute).

Figure 6:
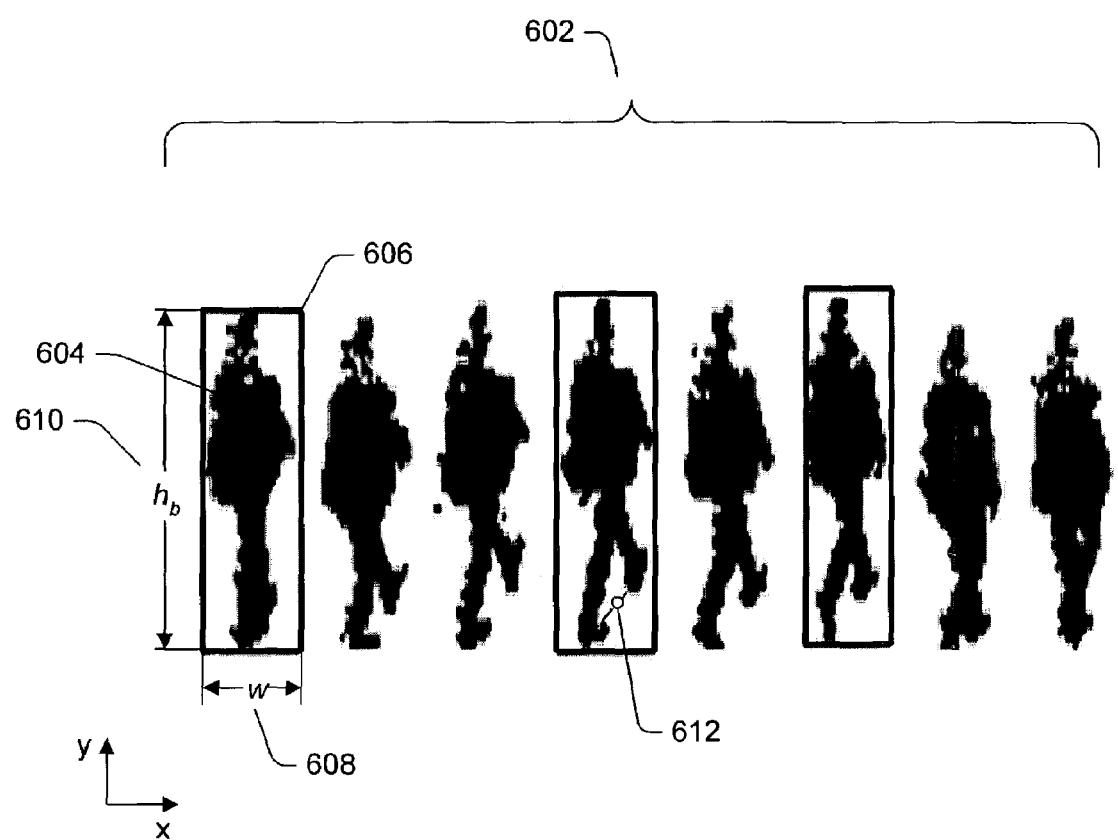
FIG. 6 shows a sequence of binary profiles of a walking subject, and also shows the use of bounding boxes used to enclose the binary profiles.

The output of the preprocessing step 402 defines a series of binary silhouettes, such as the collection 602 of silhouettes shown in FIG. 6. Bounding boxes can be used to enclose respective binary silhouettes. For instance, note exemplary binary silhouette 604 that is enclosed by bounding box 606. The width (w) 608 of the bounding box 606 is determined by the maximum span of the binary silhouette 604 in an x direction of the video frame. The height ($h_b$) 610 of the bounding box 606 is determined by the maximum span of the binary silhouette 604 in a y direction of the video frame. Note that the respective widths of the bounding boxes in the sequence 602 change slightly as the subject 102 walks along the path 104. This is due to the fact that the respective maximum spans of the binary silhouettes change over time in the x dimension as a function of the subject's 102 movement.

The second general step 404 of the method 400 shown in FIG. 4 uses the collection 602 of binary silhouettes shown in FIG. 6 to compute the gait-related features of stride and cadence. More specifically, cadence (C) (in steps per minute) and stride length (L) (in meters) are defined as:

$$C = \frac{120 \cdot F_s}{T} \quad (1)$$

$$L = \frac{W}{n/T} \quad (2)$$

where $F_s$ is the frame rate (in frames per second) of the camera 106, T represents the period of the subject's gait (in frames per cycle), W represents a distance traveled along the path 104 (in meters), n represents a number of frames used in performing the analysis, and n/T is the number of gait cycles that the subject 102 traverses over the n frames. To calculate C and L, the method 400 first determines gait period T and distance walked W. To this end, substep 414 performs the task of computing the period of the subject's 102 gait T, and substep 416 performs the task of computing the distance walked by the subject 102.

Figure 7:
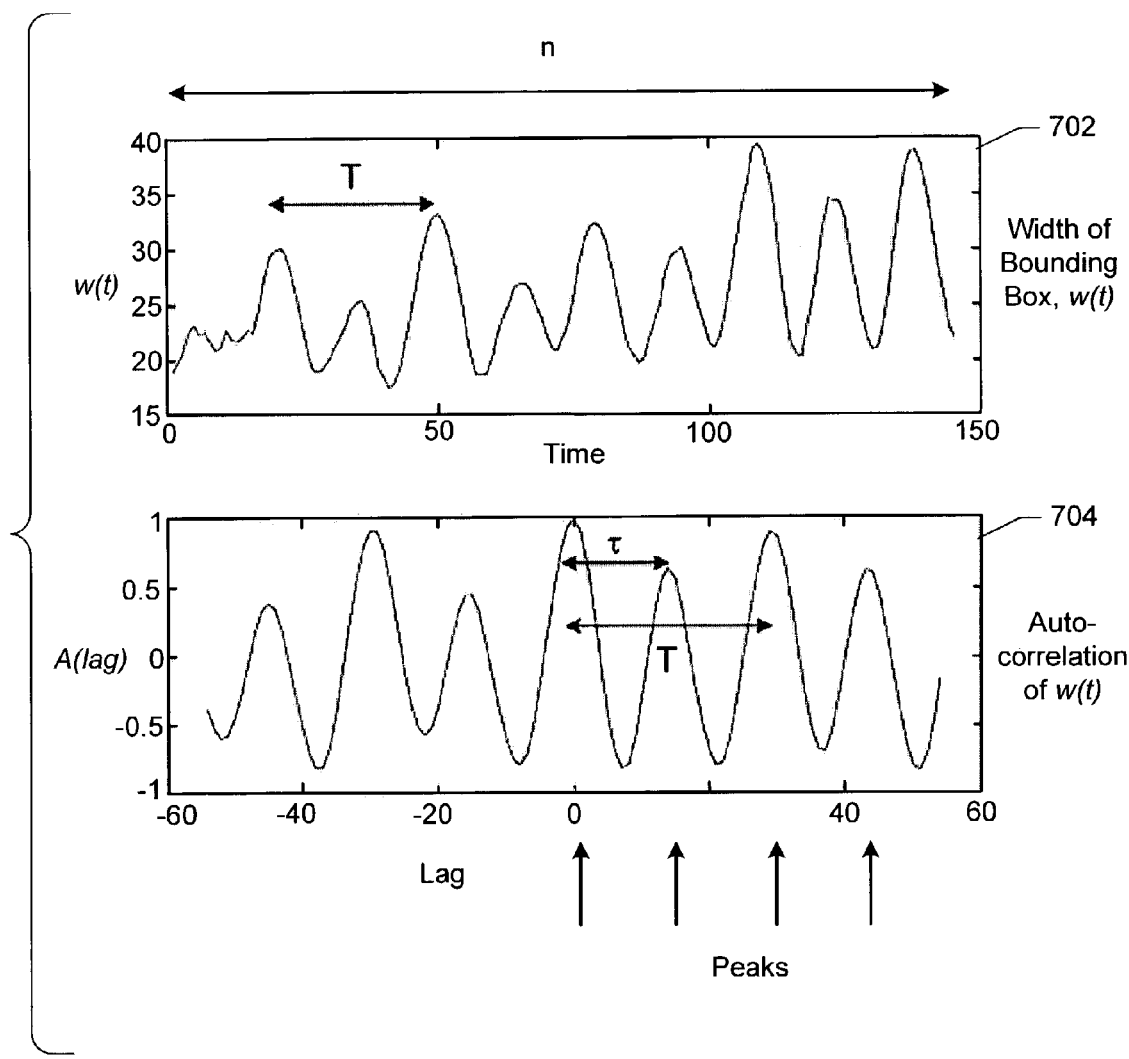
FIG. 7 shows graphs used to derive the period of the subject's gait based on the width of the bounding boxes (shown in FIG. 6) as a function of time. The graphs pertain to a walking sequence that reflects a fronto-parallel orientation of the subject with respect to the camera.

To begin, the substep 414 computes gait period T based on an analysis of periodicity in the bounding box width w as a function of time (e.g., w(t)). More specifically, human gait defines a repetitive phenomenon, so that the appearance of the walking subject 102 in a series of video frames also should exhibit periodic behavior. There are different ways to measure this periodic behavior. One technique is to calculate the width of the bounding boxes (as discussed in connection with FIG. 6) and then plot the width of the bounding boxes as a function of time. Upper graph 702 shown in FIG. 7 shows such a plot of bounding box width (w) verse time (t). The periodic appearance of the waveform shown in the upper graph 702 reflects the periodic behavior exhibited by gait.

More specifically, to compute the gait period T, substep 414 employs an autocorrelation procedure. In this procedure, step 414 first smoothes the width series w(t), and then piecewise detrends it to account for depth changes. Then, substep 414 computes its autocorrelation, A(l), for l ∈[−lag, lag], where lag is chosen such that it is much larger than the expected period of w(t). The lower graph 704 of FIG. 7 shows the autocorrelation function A(l). The peaks of A(l) correspond to integer multiples of the period of w(t). Thus, substep 414 estimates τ, the period of w(t), as the average distance between every two consecutive peaks.

Figure 8:
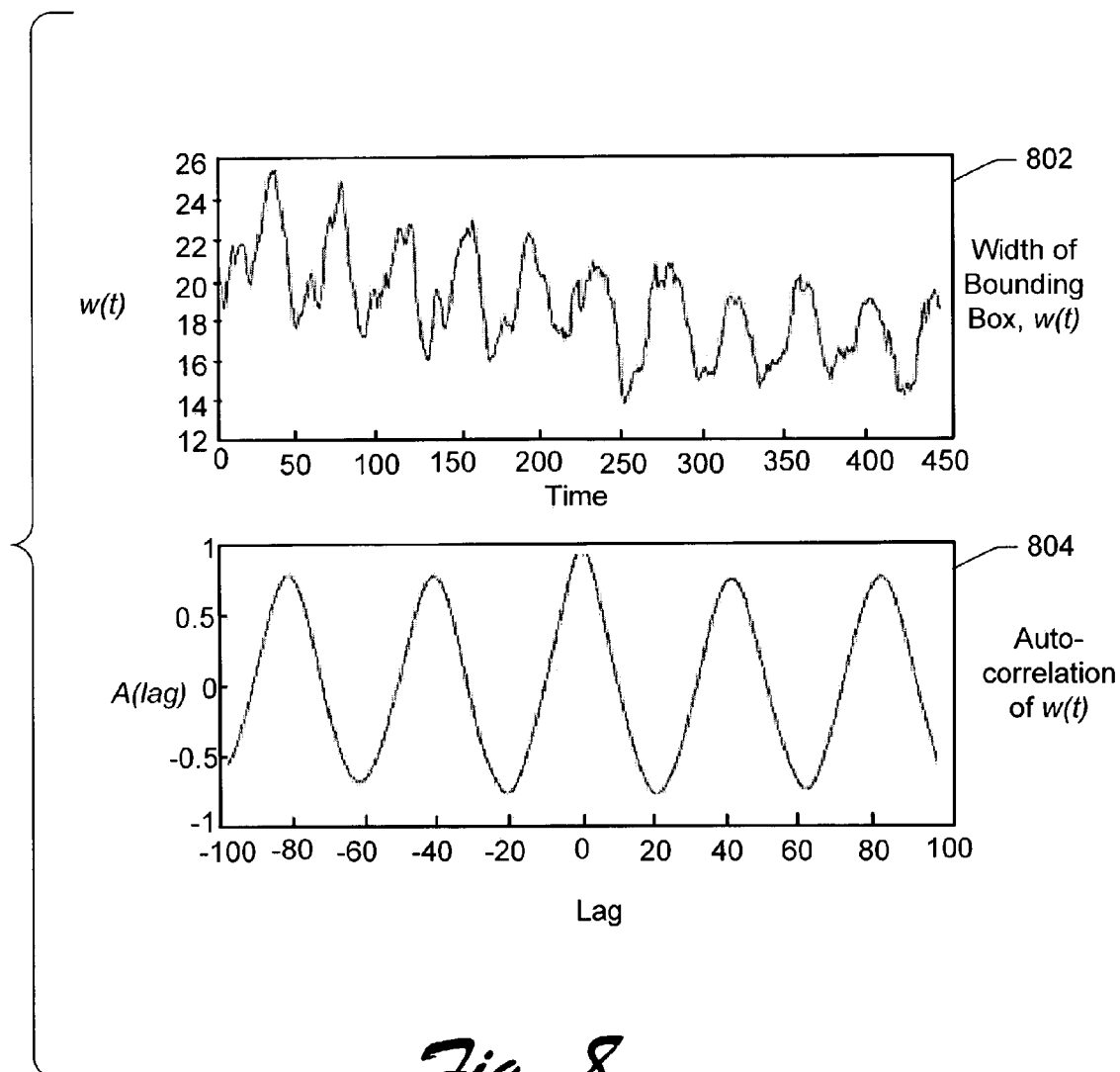
FIG. 8 shows other graphs used to derive the period of the subject's gait based on the width of the bounding boxes (shown in FIG. 6) as a function of time. The graphs pertain to a walking sequence that reflects a non-fronto-parallel orientation of the subject with respect to the camera.

The gait period T is either equal to the width period (that is, T=τ) for non-fronto-parallel sequences, or equal to twice the width period (e.g., T=2τ) for fronto-parallel sequences (or near fronto-parallel sequences). More specifically, when the subject 102 walks parallel to the camera 106's imaging plane, gait appears bilaterally symmetrical (that is, the left and right legs are almost indistinguishable in this position), which result in appearance of two peaks in w(t) in each gait period, corresponding to when either one leg is leading and is maximally apart from the other. However, as the camera viewpoint departs from the fronto-parallel orientation, one of these two peaks decreases in amplitude with respect to the other, and eventually becomes indistinguishable from noise. The above-described phenomenon is evident upon a comparison of the waveforms shown in FIG. 7 and FIG. 8. More specifically, FIG. 7 shows a width series (702) and its associated autocorrelation function (704) for a fronto-parallel sequence, while FIG. 8 shows a width series (802) and its autocorrelation (804) for a non-fronto parallel sequence. The gait period T is defined as T=2τ for the case in FIG. 7 (for a fronto-parallel sequence), and defined as T=τ for the case of FIG. 8 (for a non-fronto-parallel sequence). Note that, in accordance with the above discussion, the waveforms in FIG. 7 include more prominent peaks than the waveforms in FIG. 8.

One way of disambiguating the above-described two cases (for fronto-parallel and non-fronto-parallel sequences) is based on the fact that natural cadences of human walking lie in the range of 90 to 130 steps/min. Therefore, T must lie in the range 0.923 $F_s$ and 1.333 $F_s$ frames/cycle. Since τ and 2τ cannot both be in this interval, substep 414 selects the value that is within this interval. Another way to distinguish frontal and non-frontal sequences is by analyzing the direction of motion of the person with respect to the ground plane and the calibrated camera direction.

As mentioned above, substep 416 shown in FIG. 4 computes the distance traversed by the subject 102, that is, the "distance walked" W. To begin with, substep 416 requires a technique for mapping between video image space and real world space. To this end, assume that the subject 102 walks on a plane and that the camera 106 is calibrated with respect to this plane (as represented in FIG. 4 by step 418). In this case, substep 416 computes the 3D position ($X_F$, $Y_F$, $Z_F$) as the "inverse" projection of the location of the subject's feet in the image. Since the subject's 102 feet are mostly apart during walking, substep 416 uses a point half-way between the two feet as the subject's ground position in the image, denoted as $(x_F, y_F)$. For instance, location 612 shown in FIG. 6 is representative of an exemplary mid-feet point. Given camera intrinsic (K) and extrinsic (E) matrices, and the parametric equation of the plane of motion, P: $aX+bY+cZ+d=0$ in a well-defined world frame, and assuming perspective projection:

$$\begin{pmatrix} x \\ y \\ z \end{pmatrix} = K \begin{pmatrix} f & 0 & 0 & 0 \\ 0 & f & 0 & 0 \\ 0 & 0 & 1 & 0 \end{pmatrix} E \begin{pmatrix} X \\ Y \\ Z \\ 1 \end{pmatrix} \quad (3)$$

then we have $$\begin{pmatrix} k_{11} & 0 & -x_F + k_{13} \\ 0 & k_{22} & -y_F + k_{23} \\ \hat{a} & \hat{b} & \hat{c} \end{pmatrix} E \begin{pmatrix} X_F \\ Y_F \\ Z_F \end{pmatrix} = \begin{pmatrix} 0 \\ 0 \\ -\hat{d} \end{pmatrix} \quad (4)$$

which is a linear system of three equations and three unknowns, where $(\hat{a}, \hat{b}, \hat{c}, \hat{d}) = (a, b, c, d) \cdot E^{-1}$ and $k_{ij}$ is the (i, j)th element of K. This system lacks a unique solution only when the subject 102 is walking directly towards or away from the camera 106 (e.g., along the optical axis of the camera), which is not the case in typical surveillance applications with cameras mounted well above the ground plane. The camera calibration parameters (e.g., the matrices K and E) can be estimated by first obtaining pairs of corresponding image points and 3D points in the scene, then applying an exemplary calibration method described, for instance, by R. Tsai, "An Efficient and Accurate Camera Calibration Technique for 3d Machine Vision," in Proceedings of the Computer Vision and Pattern Recognition, 1986, or using some other calibration technique.

Given the above mapping strategy in equation (4), substep 416 can determine the distance walked W as the total distance traveled between a first and last 3D position on the ground plane, that is $W=\|P_n-P_1\|$, where $P_1$ and $P_n$ define the first and last positions in the subject's 102 course, respectively.

Having computed the gait period (T) and the distance walked (W), the second general step 404 now proceeds to calculate stride length (L) and cadence (C). More specifically, substep 422 computes stride using equation (2) defined above, while substep 420 computes cadence using equation (1) defined above.

According to equations (1) and (2), the relative uncertainties in L and C satisfy:

$$\frac{\sigma_T}{T} \cong \sqrt{(\sigma_W/W)^2 + (\sigma_T/T)^2} \text{ and } \frac{\sigma_C}{C} \cong \frac{\sigma_T}{T},$$

where $\sigma_\zeta$ generally denotes the absolute uncertainty in any estimated quantity $\zeta$. Thus, to minimize errors, it is necessary to minimize $$\frac{\sigma_W}{W} \text{ and } \frac{\sigma_T}{T}.$$

This goal can be achieved by estimating C and L over a sufficiently long sequence. More specifically, $$\frac{\sigma_T}{T}$$

can be reduced by making n (the number of frames in an analysis) sufficiently large. It is possible to compensate for a large $\sigma_W$ by making W sufficiently large.

Having computed stride length L and cadence C, the method 400 shown in FIG. 4 is now in a position to classify the subject 102 based on L and C. The third general step 406 in FIG. 4 performs this task. By way of overview, an exemplary objective of the third general step 406 is to build a supervised pattern classifier that uses the cadence and stride length as input features to identify or verify a person in a given database (of training samples). Substep 426 represents the training of the model used to perform the classification, while substep 428 represents the classification of the subject 102 using the trained model developed over a course of time. That is, substep 428 determines or verifies the subject's 102 identity based on parametric classification of a cadence and stride feature vector received from the second general processing step 404.

More specifically, the third general step 406 can employ a Bayesian decision approach to classifying subjects based on cadence and stride length. Two different parametric models are used to model the class conditional densities in the Bayesian approach. In the first model, the cadence and stride length of any one subject are related by a linear regression. In the second model, the cadence and stride length are assumed to vary as a bivariate Gaussian.

Figure 9:
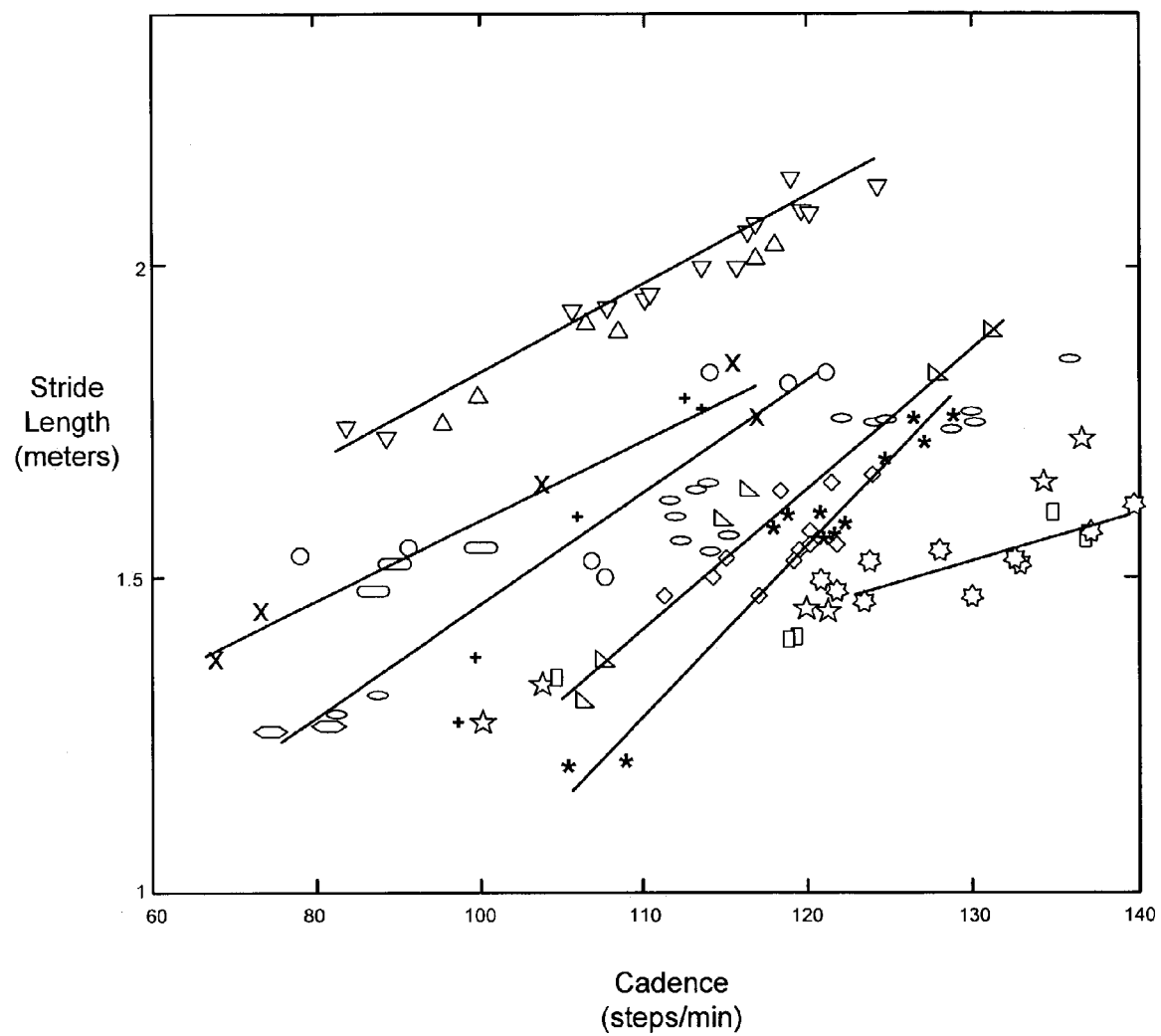
FIG. 9 shows a mapping of measured stride length (L) and cadence(C), particularly illustrating the linear relationship between stride length and cadence.

The task of estimating parameters for the above-described models is described as follows. Generally, a training sample of a subject's stride length and cadence is used, that is, $(C_1, L_1), (C_2, L_2), \ldots, (C_n, L_n)$. Maximum Likelihood (ML) estimation is used to compute the model parameters of the corresponding class conditional densities. In the case of the linear regression model, stride length and cadence are known to vary approximately linearly for any one subject over his or her range of natural (or spontaneous) walking speeds, typically in the range 90-125 steps/minute. For instance, note FIG. 9, which shows measured stride length vs. cadence for a group of subjects. Note that the points associated with any one person (drawn with the same symbol) lie approximately in a straight line (note that the best fitting line is only shown for six of the subjects in the group). Hence, for each class (i.e., subject) $\psi_i$ in the training set, the following linear regression model is assumed: $L = a_i C + b_i + \epsilon_i$, where $\epsilon_i$ represents random noise. The class conditional probability of a measurement $x \equiv (L C)$ is then given by: $\Pr(x|\psi_i) = p_{\epsilon_i}(r)$, where $p_{\epsilon_i}$ is the probability density of $\epsilon_i$ and $r = L - a_i C - b_i$ is the residual. Assuming $\epsilon_i$ is white noise (that is, $\epsilon_i \sim N(0, \sigma_i)$), the ML-estimate of the model parameters $a_i$ and $b_i$ and are obtained via a linear least squares (LSE) technique on the given training sample. Furthermore, the log-likelihood of any new measurement x with respect to each class $\psi_i$ is obtained by:

$$l_i(x) = \log p_{\varepsilon_i}(r) = \frac{1}{2}\left(\frac{r}{s_i}\right)^2 + \log s_i + \frac{1}{2}\log 2\pi,$$

where $s_i$ is the sample standard deviation of $\varepsilon_i$. Since the above model only holds over a limited range of cadences [$Cmin_i$, $Cmax_i$], that is, $L = a_i C + b_i$ is not an infinite line, we set $l_i(x) = 0$ whenever C is outside [$Cmin_i - \delta$, $Cmax_{i+}\delta$], where $\delta$ is a small tolerance (for instance, $\delta = 2$ steps/min). Since this range varies for each subject, it is necessary to estimate it from representative training data.

A less complex model of the relationship between cadence and stride length is a bivariate Gaussian distribution, e.g., $Pr(x|\psi) \approx N(\mu_i, \Sigma_i)$ for the ith class. The parameters of the model, $\mu_i$ and $\Sigma_i$, for the ith class are estimated respectively as the sample mean mi and sample covariance $S_i$ of the given training sample. The log-likelihood of a new observation $x \equiv (CL)$ with respect to the ith class is then computed as $$l_i(x) = \frac{1}{2}(x - m_i)^2 \sum_i^{-1}(x - m_i) + \frac{1}{2}\left|\sum_i\right| + \frac{1}{2}2\pi.$$

In summary, according to one exemplary implementation, a method for identifying an ambulatory subject based on video analysis of the subject's gait is described. The method includes: (a) acquiring a sequence of images that collectively captures the gait of the subject; (b) determining the following features from the sequence of images: (i) cadence of gait; and (ii) stride length of gait, where the cadence and the stride length are related to each other by a linear function; and (c) identifying the subject based on the subject's cadence, stride length, and based on the linear function used to relate cadence with stride length.

A related apparatus and computer-readable medium for implementing the above method are also described.

C. Technique for Recognizing Subjects Using Stride, Cadence, and Height

Figure 10:
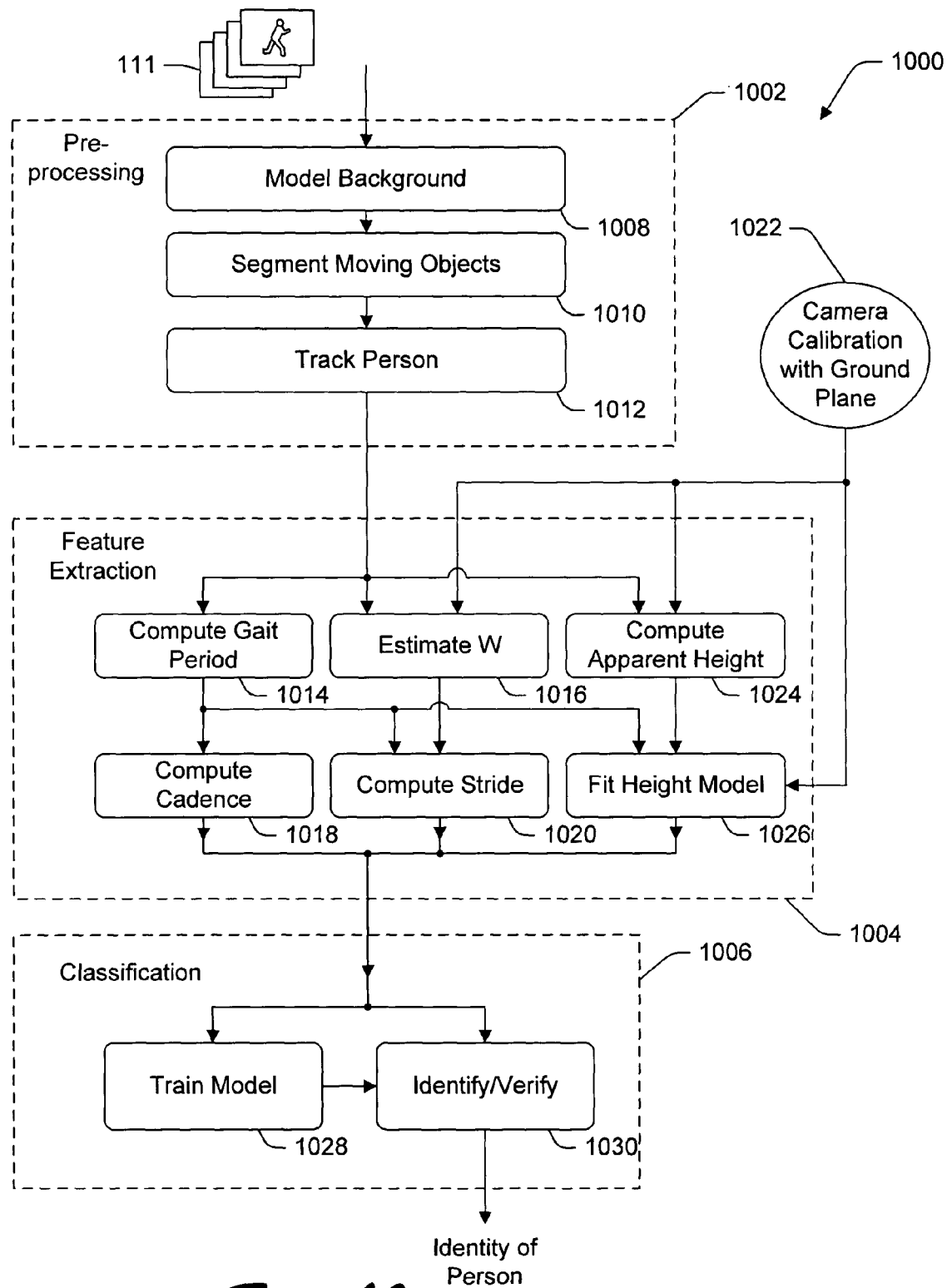
FIG. 10 shows another exemplary technique for identifying the subject based on gait-related features of stride, cadence, and apparent height.

FIG. 10 shows another exemplary method 1000 for identifying a subject based on the gait-related features of stride and cadence, as in the case of FIG. 4, and, in addition, the parameter of height. Part of the operation of the method 1000 is similar to the method 400 shown in FIG. 4, and hence, emphasis will be placed in the following discussion on functionality which is unique to method 1000.

Like method 400, method 1000 includes three general steps corresponding to the logic modules provided in the gait analysis logic 114 of FIG. 1. Namely, in a first general step 1002, video data 108 is preprocessed to transform it into a form suitable for feature extraction. In the second general step 1004, the transformed video data 108 is processed to extract stride, cadence, and height parameters from the transformed data. In a third general step 1006, the extracted features are used to classify the subject 102, or otherwise derive some attribute pertaining to the subject 102. Each of the above-described general steps will be described in further detail below.

The first general step, i.e., step 1002, is similar to general step 402 of FIG. 4. It includes a first substep 1008 that entails modeling background information in the video data 108, a second substep 1010 that entails segmenting moving objects in the video data 108, and a third substep 1012 that entails tracking the subject 102 within the video data 108. As previously described, substeps 1008 and 1010 generally involve identifying background information in the scene represented by the video data 108, identifying foreground information in the scene, and extracting the foreground information from the background information. Once the subject 102 has been detected in a video frame, substep 1012 involves tracking the subject 102 in subsequent frames. In one exemplary technique, binary silhouettes are tracked from frame to frame in the video data 108 using a spatial and temporal coherence technique.

The output of the first general step 1002, as in the case of method 400, consists of a sequence of binary silhouettes. The second general step 1004 computes cadence and stride length based on these binary silhouettes in the same manner as described above in connection with FIG. 4. Namely, substep 1014 computes gait period T, and substep 1016 computes walked distance W. Substep 1018 computes cadence using equation (1) defined above, and substep 1020 computes stride length using equation (2) defined above. Further, in order to properly perform the above-described steps, step 1022 is performed to calibrate the camera 106 with respect to the ground plane. More specifically, this calibration operation facilitates the estimation of W in substep 1016, as well as other operations to be described below.

The height parameter is measured in substeps 1024 and 1026. By way of introduction, human walking involves rhythmic up-and-down displacement of the upper body (from pelvis to head), which causes apparent bobbing of the head. Thus, the "apparent height" of the walking subject person can be modeled as a sinusoidal curve:

$$h(t) = \mu_h + \alpha_h \sin(\omega t + \phi) \quad (5).$$

The maximum apparent height, $\mu_h + \alpha_h$, occurs at the midstance phase of walking (when the legs are closest together), and is slightly smaller than the person's height while standing still, referred to as "stature" H. The minimum height, $\mu_h - \alpha_h$, occurs at the mid-swing phase of walking (when the legs are furthest apart).

Figure 11:
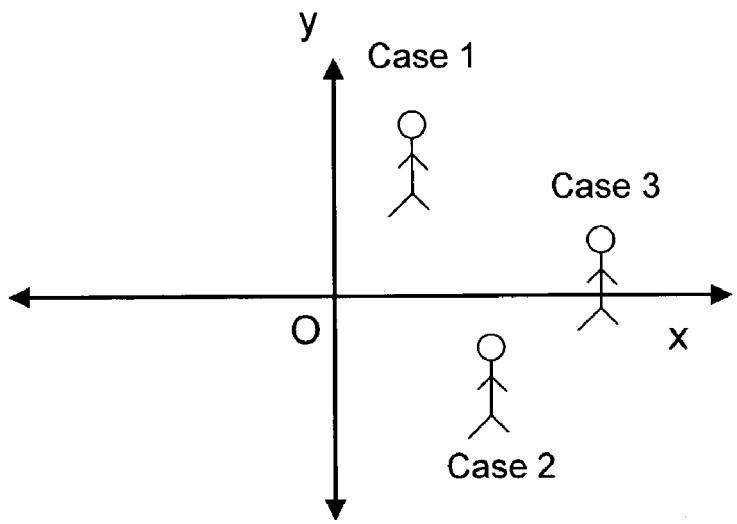
FIG. 11 shows the orientation of the camera with respect to the subject for three different identified cases pertinent to the computation of the apparent height of the subject.
Figure 12:
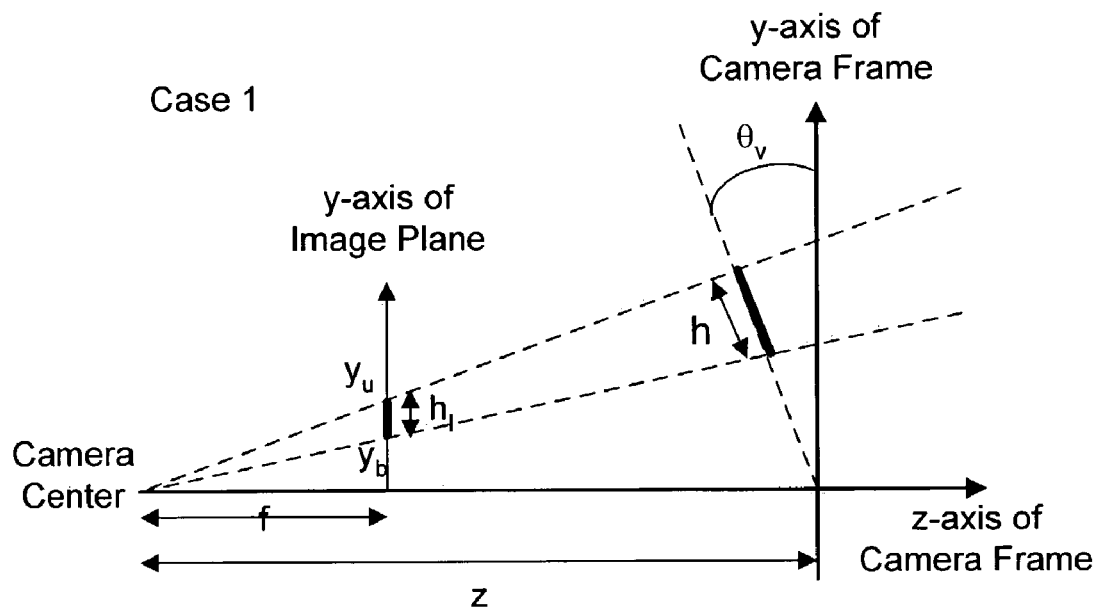
FIGS. 12-14 show the geometrical parameters relevant to the computation of apparent height for three different cases that are illustrated in FIG. 14.
Figure 13:
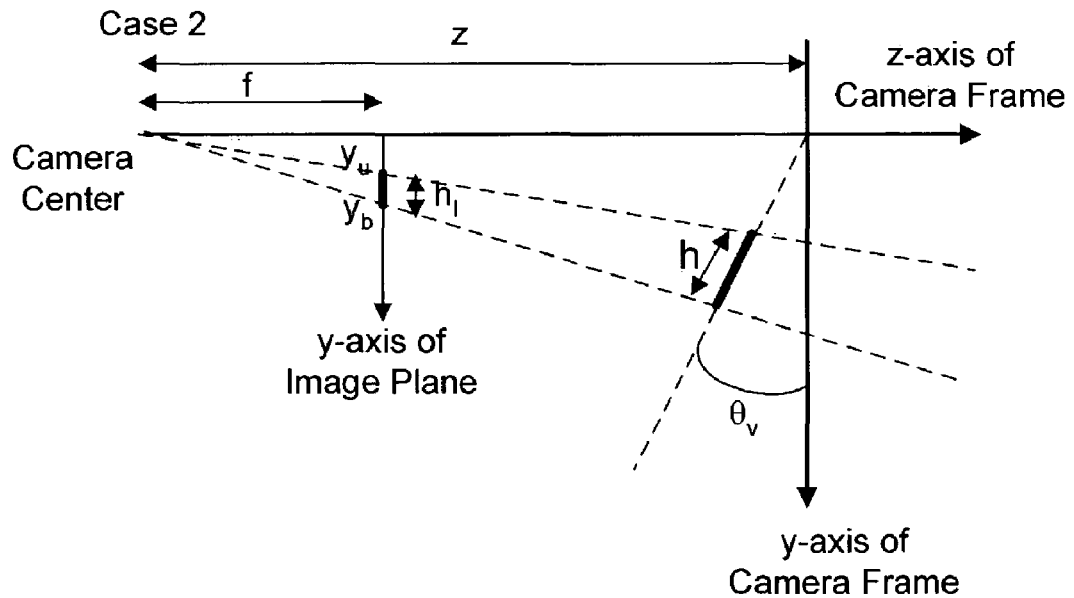
Figure 14:
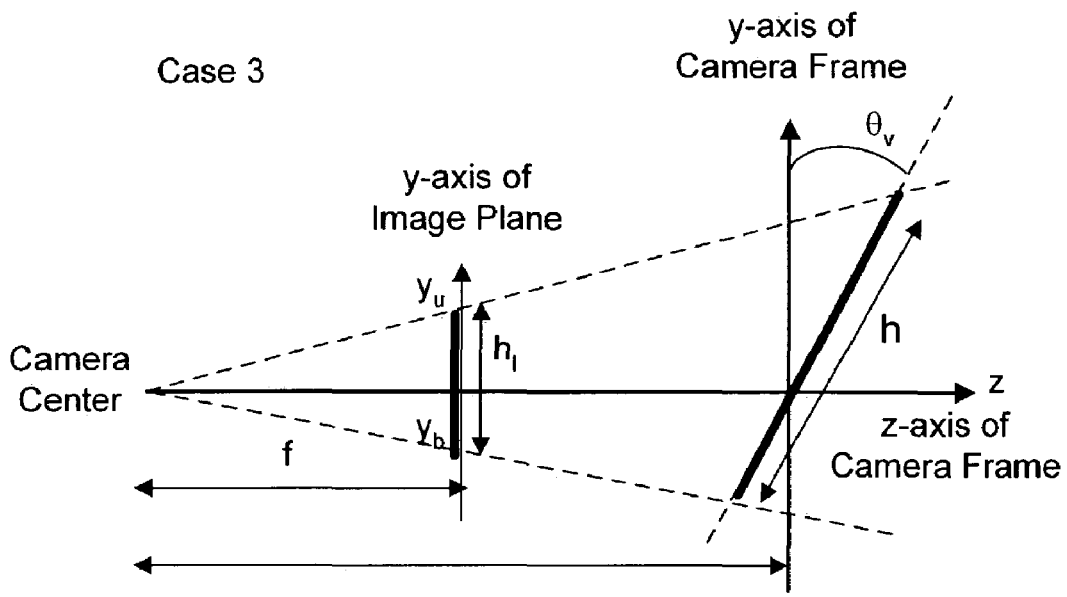
Figure 15:
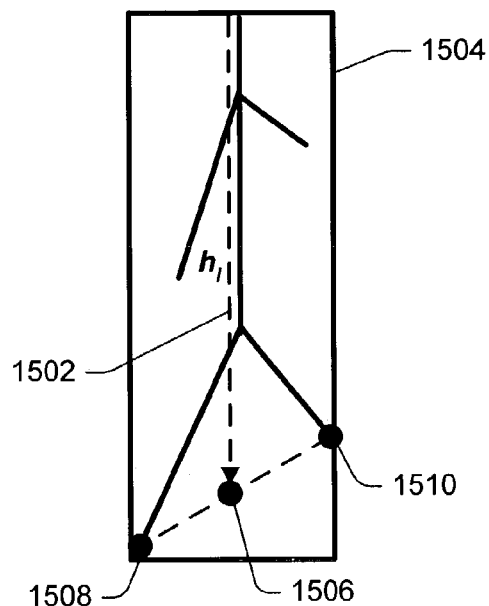
FIG. 15 shows a simplified representation of the subject's profile, illustrating the measurement of image height in a non-fronto-parallel orientation.

Substep 1024 computes the subject's apparent height h over a period of time t. It performs this task by mapping the height of the subject in the image, $h_I$, to their actual real-world apparent height h. More specifically, three different equations apply for mapping $h_I$ to actual apparent height h, that is, for a first case where the subject 102 is entirely above the image center, a second case where the subject 102 is entirely below the image center, and a third case where the subject 102 is located at the center of the image. FIG. 11 graphically illustrates the orientations of the camera 106 and subject 102 with respect to the first, second, and third cases. FIGS. 12-14 illustrate geometrical considerations relevant to the mapping of $h_I$ to apparent height h for the above-described three cases, on which the following three equations are based:

$$h = \frac{\frac{h_I}{f}Z}{\cos\theta_v - \frac{y_u}{f}\sin\theta_v} \quad (6)$$

$$h = \frac{\frac{h_I}{f}Z}{\cos\theta_v - \frac{y_b}{f}\sin\theta_v} \quad (7)$$

-continued $$h = \frac{\frac{h_I}{f}Z}{\cos\theta_v - \frac{y_u}{f}\sin\theta_v} + h = \frac{\frac{h_I}{f}Z}{\cos\theta_v - \frac{y_b}{f}\sin\theta_v} \quad (8)$$

where $y_b$ and $y_u$ are coordinates in the image respectively defining the subject's lower body (e.g., feet) and upper body (e.g., head), $h_I = y_u - y_b$ is the subject's height in the image, $\theta_v$ is the tilt angle of the camera 106, $f$ is the camera focal length (in pixels), and Z is the distance from the camera center to the subject (that is, the depth). Again, the above three equations pertain to the cases where the subject is entirely above the image center (equation 6), entirely below the image center (equation 7), or neither completely above or below the image center (equation 8). Note that when the person is sufficiently far from the camera, h reduces to the numerator $$\frac{h_I}{f}Z.$$

As indicated by step 1022 in FIG. 10, proper calibration of the camera with respect to the ground plane should be performed to ensure calculation of apparent height.

Figure 16:
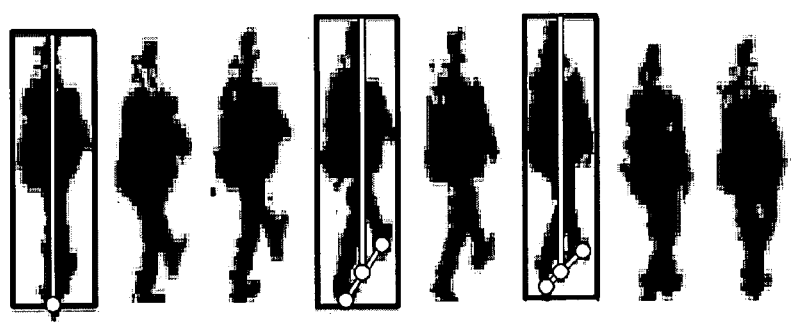
FIG. 16 shows the application of the height measurement technique shown in FIG. 15 to a series of binary profiles reflecting a non-fronto-parallel orientation.
Figure 17:
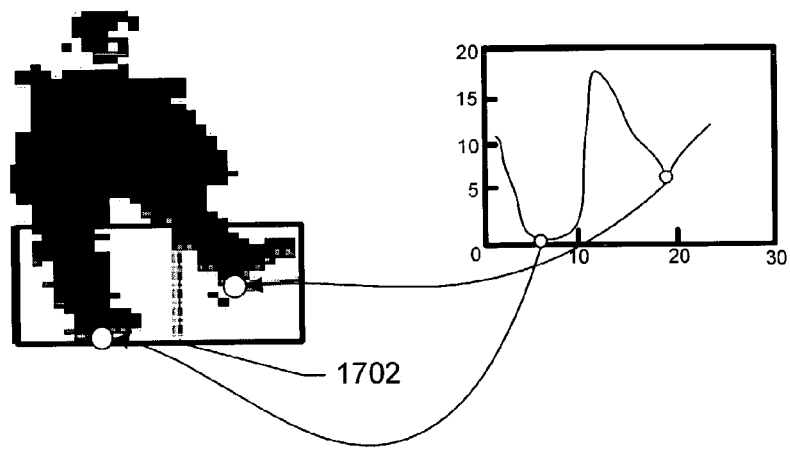
FIG. 17 shows a magnified view of a binary profile in a non-fronto-parallel orientation, showing the application of the measurement technique shown in FIG. 15 to measure image height.
Figure 18:
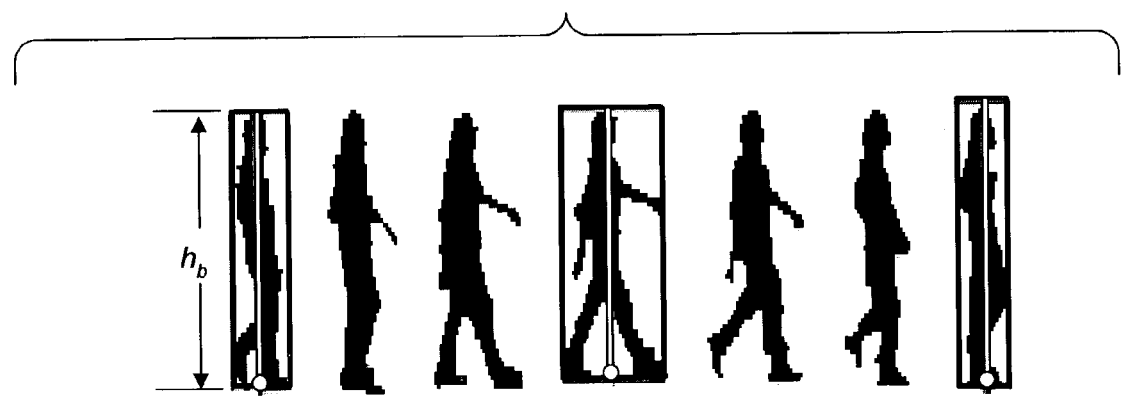
FIG. 18 shows the application of the height measurement technique shown in FIG. 15 to a series of binary profiles reflecting a fronto-parallel orientation.

FIGS. 15-18 further clarify the meaning of the above-identified parameters used to calculate apparent height. With reference first to the stick figure model of FIG. 15, the subject's height in the image, $h_I$, is estimated as the vertical distance between the head and the feet of the subject. In a non-fronto-parallel sequence, which pertains to the representation shown in FIG. 15, this distance is approximated as a vertical segment 1502 that extends from the top of the bounding box 1504 (e.g., where the head is located) to the point 1506 halfway between the subject's two feet (1508, 1510, respectively). FIG. 16 shows the application of the height measurement strategy shown in FIG. 15 to an actual sequence of binary silhouettes in a non-fronto-parallel sequence. FIG. 17 shows an exploded view of one of the binary silhouettes shown in FIG. 16, particularly showing the measurement of the x coordinates corresponding to respective positions of the subject's feet. This information can be used to find the point 1702 positioned midway between the subject's feet. Finally, FIG. 18 shows the measurement of height $h_I$ for a fronto-parallel sequence. In the fronto-parallel case, $h_I$ corresponds to the bounding box height ($h_b$) of the binary silhouette.

Having computed the time-series h(t) of apparent heights of a walking person measured over a video sequence of length n, substep 1026 comes into play by fitting the measured height values to the model defined above in equation (5), and then identifying the parameters which provide the best fit. More specifically, assuming a known frequency of gait $$\omega \left( \text{note } \omega \equiv \frac{2\pi}{T} \right),$$

substep 1026 estimates three model parameters using a least squares fitting technique. More specifically, assuming a data model:

$$h(t) = \mu_h + \alpha_h \sin(\omega t + \phi) + \epsilon_t, \ t = 0, 1 \ldots, n \quad (9)$$

the unknown parameters of the model that minimize the sum-square of the residuals $\epsilon$ are given by $$\mu_h = \frac{1}{n}\sum_{t=1}^{n} h(t)$$

and $\alpha_h = \sqrt{A^2 + B^2}$, where $$A = \frac{2}{n}\sum_{t=1}^{n}(h(t) - \bar{h})\cos\omega t$$

and $$B = \frac{2}{n}\sum_{t=1}^{n}(h(t) - \bar{h})\sin\omega t.$$

Figure 19:
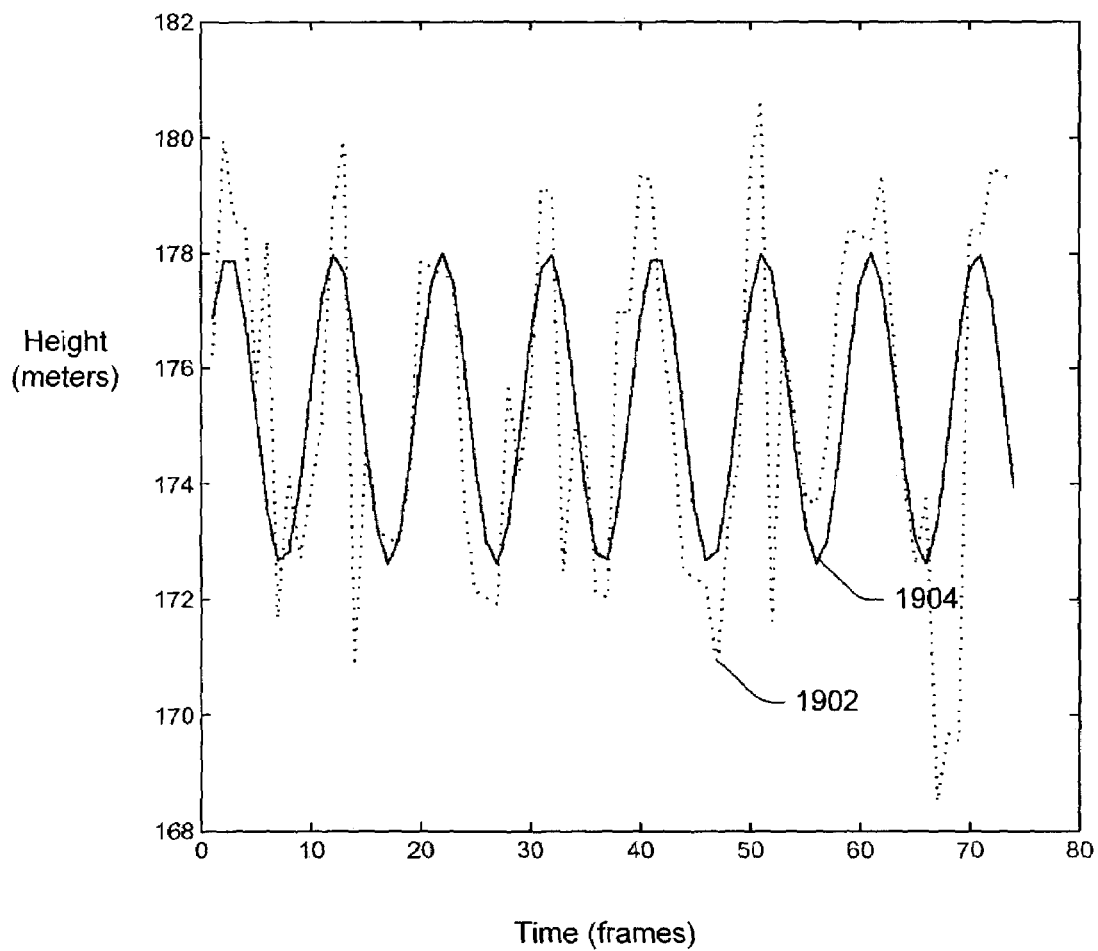
FIG. 19 presents a graph that shows the relation between measured height and a model used to approximate the measured height.

FIG. 19 shows an example of a height series (dashed line 1902) fitted to a model (solid line 1904)) via the above method. In this exemplary case, $\mu_h \cong 175.3$ cm and $\alpha_h \cong 2.7$ cm, and the subject's actual height is 177 cm.

The stature (H) of the subject 102 can be approximated relatively accurately from the apparent height parameters, that is, $H \cong \mu_h + \alpha_h$. However, in subsequent classification analysis, method 1000 shown in FIG. 10 uses the raw parameter data ($\mu_h$ and $\alpha_h$) rather than the stature height. This is because $\mu_h$ and $\alpha_h$ are together more "informative" than H for the purpose of characterizing gait behavior.

As to error analysis, as mentioned above, the uncertainty both in C and L is a decreasing function of the number of steps walked, N, and hence can be effectively reduced by using a large N, regardless of whether the uncertainty is caused by random or systematic error. Systematic error can, for example, be caused by strong shadows that are segmented with the silhouette. However, the uncertainty in height does not possess the above-described property; that is, the uncertainty in height does not necessarily decrease when estimated over many frames. Intuitively, this is because height is estimated independently in each frame, while a single estimate of cadence and stride length is computed over an entire sequence. Assuming for simplicity that $\theta_v \approx 0$ in equation Nos. 6-8, then the uncertainty $\sigma_{\hat{h}}$ in each height measurement $\hat{h}$ is given by:

$$\sigma_{\hat{h}} = \hat{h}\sqrt{\left(\frac{\sigma_{h_I}}{h_I}\right)^2 + \left(\frac{\sigma_Z}{Z}\right)^2} \quad (10)$$

Thus, the only way to reduce this uncertainty is by reducing the uncertainty in Z and $h_I$, denoted by $\sigma_z$ and $\sigma_{h_I}$, respectively.

The above-described four gait features, $\mu_h, \alpha_h$, C, and L, are all correlated, and it can be expected that they together form "tight modes" in 4-D space for use in classification. To this end, general step 1006 recognizes subjects captured in video using the gait-related parameters described above, namely C, L, $\mu_h$ and $\alpha_h$ (note that apparent height can be regarded as a gait-related parameter because it is an artifact of the walking movement). More specifically, the third general step 1006 builds a supervised pattern classifier that uses the two height-related parameters ($\mu_h, \alpha_h$), C, and L as input features to identify or verify a person in a given database (of training samples). That is, substep 1028 represents the training of the model used to perform the classification, while substep 1030 represents the classification of the subject 102 using the trained model developed over a course of time. More specifically, substep 1030 determines or verifies the subject's 102 identity based on the gait-related parameters C, L, $\mu_h$ and $\alpha_h$ discussed above. In one implementation, the classification can use a K nearest neighbor non-parametric pattern classifier to perform its classification tasks in the 4-D feature space of the above-described four gait-related parameters.

In summary, according to one exemplary implementation, a method is described for determining height parameters that describe a dynamically varying height of an ambulatory subject based on video analysis of the subject. The method includes: (a) acquiring a sequence of images that collectively captures the gait of the subject; (b) measuring a dynamically varying height function of the subject based on an analysis of the varying height of the subject in the sequence of images; and (c) fitting the dynamically varying height function of the subject to a model that describes varying height, wherein the height parameters correspond to parameters used in the model. In one exemplary implementation, the height parameters, along with cadence of gait and stride length of gait, can be used to identify the ambulatory subject.

The above-mentioned model represents an ideal variance in height as a sinusoidal function. The parameters used in the model include a first parameter that describes a baseline height value exhibited by a person in ambulatory motion, and a second value that describes a maximum deviation from the baseline height value. The above-mentioned measuring of the dynamically varying height function includes: (a) extracting a series of depictions of the ambulatory subject from a larger body of image information contained within the sequence of images; (b) defining a series of bounding boxes that enclose respective depictions; and (c) for each of the depictions, determining a distance between a point midway between the feet of the subject and a top of the depiction's associated bounding box.

A related apparatus and computer-readable medium for implementing the above method are also described.

Figure 20:
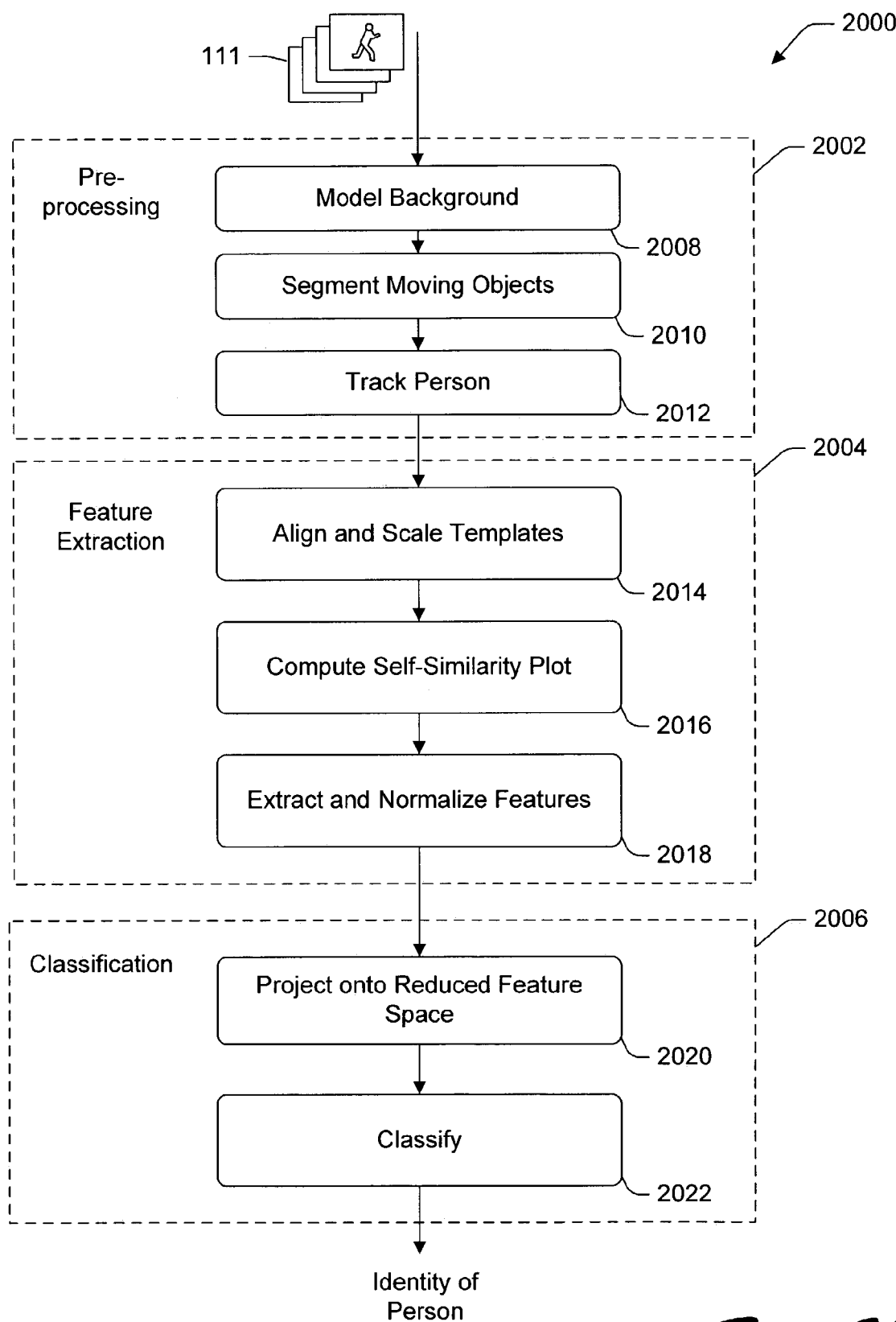
FIG. 20 shows a technique for identifying the subject using a holistic gait-recognition approach.

D. A Non-Parametric Technique for Recognizing Subjects Using Self-Similarity Plots FIG. 20 shows another exemplary method 2000 for identifying a subject based on gait-related features. This method 2000 relies on a holistic technique to derive the features used to characterize gait, rather than a theoretical model-based technique as in the case of the prior two methods (in FIGS. 4 and 10). In particular, the method 2000 uses self-similarity plots (SSP's) (to be defined below) to extract features from video images without having to identify and extract specific model-based information from the video images. The method 2000 is deemed "holistic" because the SSP represents a direct transformation of the spatiotemporal volume (XYT) of the walking person. Otherwise, part of the operation of the method 2000 is similar to the methods 400 and 1000 shown in FIGS. 4 and 10, respectively, and hence, emphasis will be placed in the following discussion on functionality which is unique to method 2000.

Like methods 400 and 1000, method 2000 includes three general steps corresponding to the logic modules provided in the gait analysis logic 114 of FIG. 1. Namely, in a first general step 2002, video data 108 is preprocessed to transform it into a form suitable for feature extraction. In the second general step 2004, the transformed video data 108 is processed to extract gait-related parameters using self-similarity plots. In a third general step 2006, the extracted features are used to classify the subject 102, or otherwise derive some attribute pertaining to the subject 102. Each of the above-described general steps will be described in further detail below.

The first general step, i.e., step 2002, is similar to general steps 402 and 1002 of FIGS. 4 and 10, respectively. It includes a first substep 2008 that involves modeling background information in the video data 108, a second substep 2010 that entails segmenting moving objects in the video data 108, and a third substep 2012 that entails tracking the subject 102 within the video data 108. As previously described, substeps 2008 and 2010 generally involve identifying background information in the scene represented by the video data 108, identifying foreground information in the scene, and extracting the foreground information from the background information. Once the subject 102 has been detected in a video frame, substep 2012 involves tracking the subject 102 in subsequent frames. In one exemplary technique, binary silhouettes are tracked from frame to frame in the video data 108 using a spatial and temporal coherence technique.

The output of the first general step 2002, as in the case of method 2000, consists of a sequence of binary silhouettes. In the context of the method 2000, the binary silhouettes are referred to as "templates." (For instance, image 502 in FIG. 5 represents one exemplary template.) Each of these templates is characterized by a bounding box which encloses a "blob" that depicts a snapshot of the walking subject 102 at a particular point in time. The bounding boxes generally resemble the bounding boxes (e.g., box 606) shown in FIG. 6. However, in this application, the bounding boxes may include an "empty" region around its perimeter (e.g., a 10-pixel border) in order to allow for shifting that may occur when later computing the cross-correlation of template pairs (to be described below). In alternative implementations, the templates 502 or 506 shown in FIG. 5 can be used to extract gait-related parameters, that is, as opposed to the binary template 508. There are competing tradeoffs to using any of the image templates shown in FIG. 5 in measuring image similarity for computing the SSP. For instance, the first template 502 does not require segmentation and is hence insensitive to segmentation errors. The third template 508 is more robust to clothing and background variations. And the second template 506 provides a hybrid of the first and third kinds of templates (502, 508); that is, the second template 506 is robust to background variations but sensitive to segmentation errors and clothing variations.

The general step 2004 extracts features from the above-described templates. This step 2004 begins with substep 2014, which entails aligning and scaling the templates. More specifically, template size can vary according to camera viewpoint and depth. Accordingly, substep 2014 scales the templates to a fixed height (e.g., 50 pixels) prior to computing the SSP, and also aligns the templates.

Substep 2016 computes a self-similarity plot (SSP) based on the collected templates. One exemplary technique for forming the SSP is as follows. Let $I_i$ represent the ith scaled template with size $\tilde{w}_i \times \tilde{h}_i$ (in pixels). The corresponding self-similarity plot $S(i, j)$ is computed as the absolute correlation of each pair of templates $I_i$ and $I_j$, minimized over a small search radius r, namely:

$$S(i, j) = \min_{|dx|<r,|dy|<r} \sum_{|x|\leq\frac{W}{2}} \sum_{|y|\leq\frac{H}{2}} |I_j(x+dx, y+dy) - I_i(x, y)| \quad (11)$$

where $W=\min(\tilde{w}_i, \tilde{w}_j-2r)$ and $H=\min(\tilde{h}_i, \tilde{h}_j-2r)$ so that the summation does not go out of bounds. In other words, the SSP constitutes a matrix of cross-correlation between pairs of image templates in the sequence of templates. The term "self-similarity" denotes the fact that the sequence of templates is compared with itself to provide a measure of similarity between different parts of the sequence of templates. Absolute correlation is used in the above analysis for its simplicity. But other similarity measures can be used, including normalized cross-correlation, the ratio of overlapping foreground pixels, Hausdorff distance, Chamfer distance, binary threshholding of the image (which removes variations of clothing colors and only uses shape and motion to compute the SSP), etc.

Figure 21:
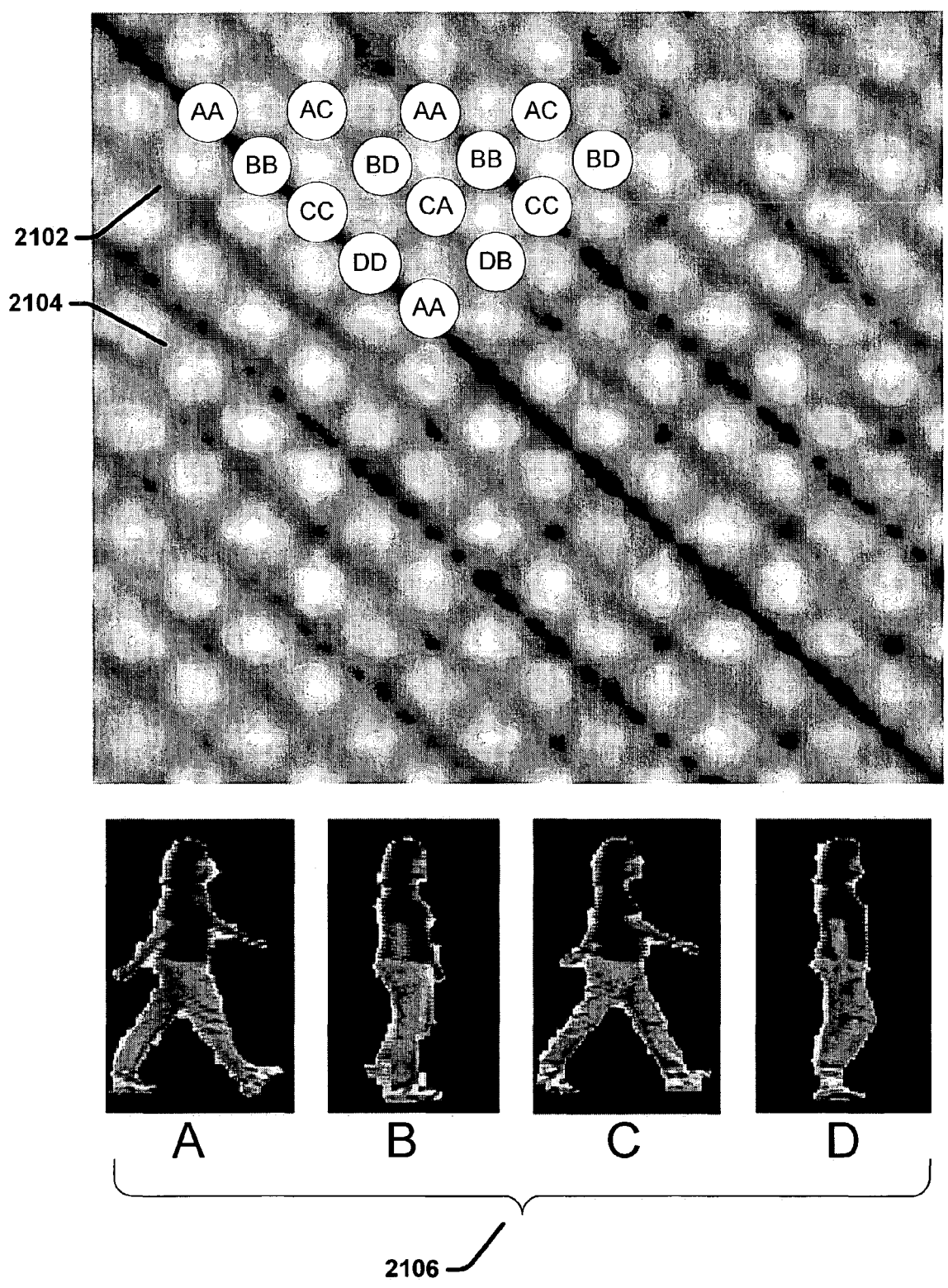
FIG. 21 shows a computed self-similarity plot for the case of the fronto-parallel orientation.
Figure 22:
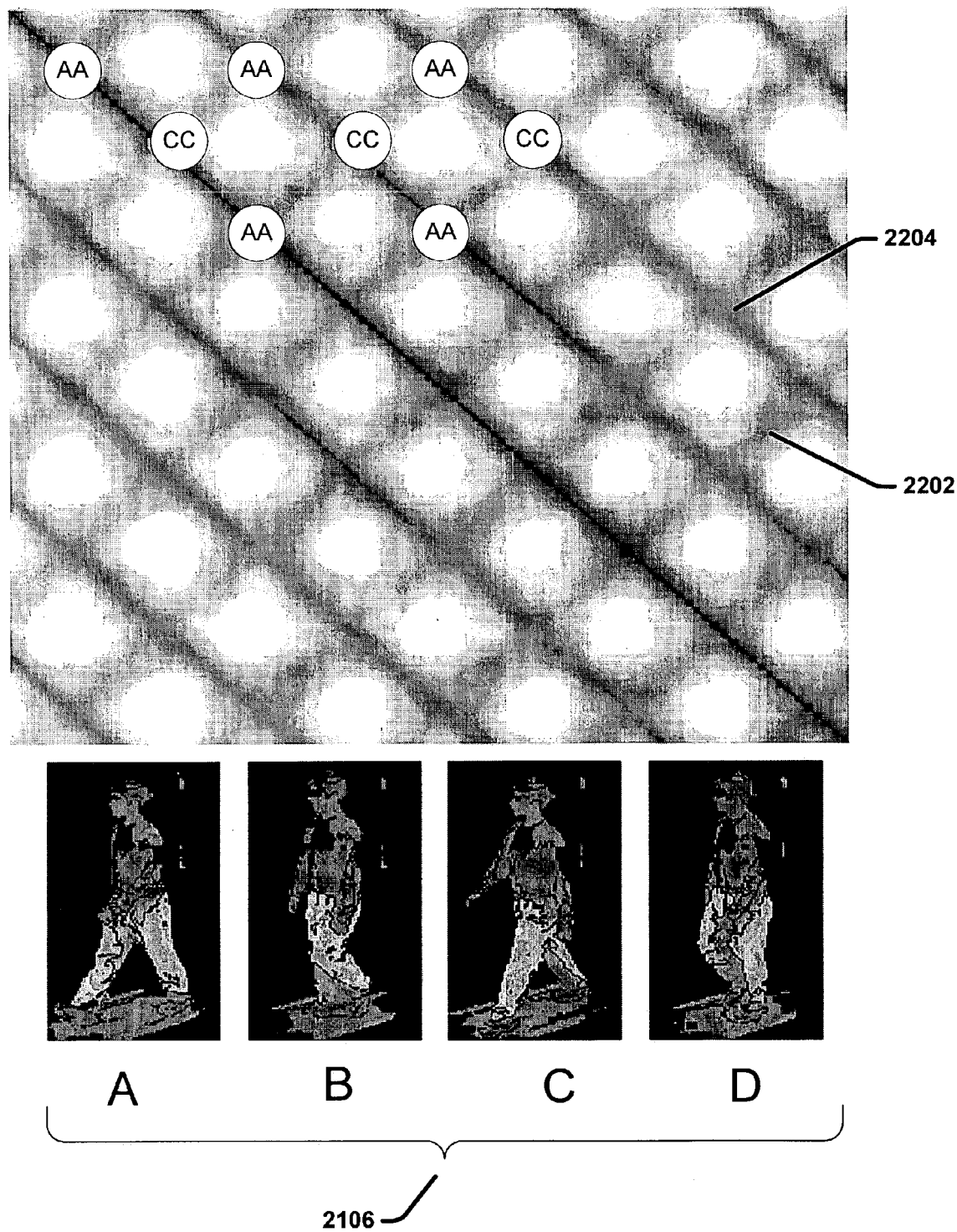
FIG. 22 shows another computed self-similarity plot for the case of the non-fronto-parallel orientation.

FIGS. 21 and 22 highlight some of the properties of S for fronto-parallel (FIG. 21) and non-fronto-parallel (FIG. 22) walking sequences. The horizontal axis in an SSP represents an arrangement of templates in the order in which these templates where captured by the video camera (e.g., as in the sequence 602 shown in FIG. 6). The vertical axis in an SSP represents a sequence of the very same templates. Accordingly, any point in the SSP pairs one template in the sequence with another template in the same sequence (the diagonal running down the middle of the SSP identifying two versions of the same template in the sequence). In FIGS. 21 and 22, similarity values computed using equation (11) are linearly scaled to the grayscale intensity range (0 to 255) for visualization.

More specifically, the dark diagonals in FIGS. 21 and 22 are due to the periodicity of gait (e.g., note exemplary diagonal 2102 in FIG. 21 and exemplary diagonal 2204 in FIG. 22), while the cross-diagonals are due to the temporal mirror symmetry of the gait cycle (e.g., note exemplary cross-diagonal 2104 in FIG. 21 and exemplary cross-diagonal 2202 shown in FIG. 22). The intersections of these diagonals, e.g., representing the local minima of S, correspond to key poses of the gait cycle. Specifically, each intersection corresponds to a combination of the following four key poses of gait: (i) when the two legs of the subject are furthest apart and the left leg is leading; (ii) when the two legs are joined together and the right leg is leading; (iii) when the two legs are furthest apart and the left leg is leading; and (iv) when the two legs are joined together and the left leg is leading. These poses are labeled as A, B, C, and D, respectively. FIGS. 21 and 22 include exemplary templates that illustrate the poses corresponding to labels A, B, C, and D. That is, note exemplary poses 2106 in FIG. 21, and exemplary poses 2206 in FIG. 22. Some of the intersections shown in FIG. 21 are not present in the SSP of FIG. 22 because the non-fronto-parallel gait does not appear bilaterally symmetric, and thus does not give rise to these diagonals. Generally, it can be seen that the SSP encodes both the frequency and phase of the gait cycle.

Figure 23:
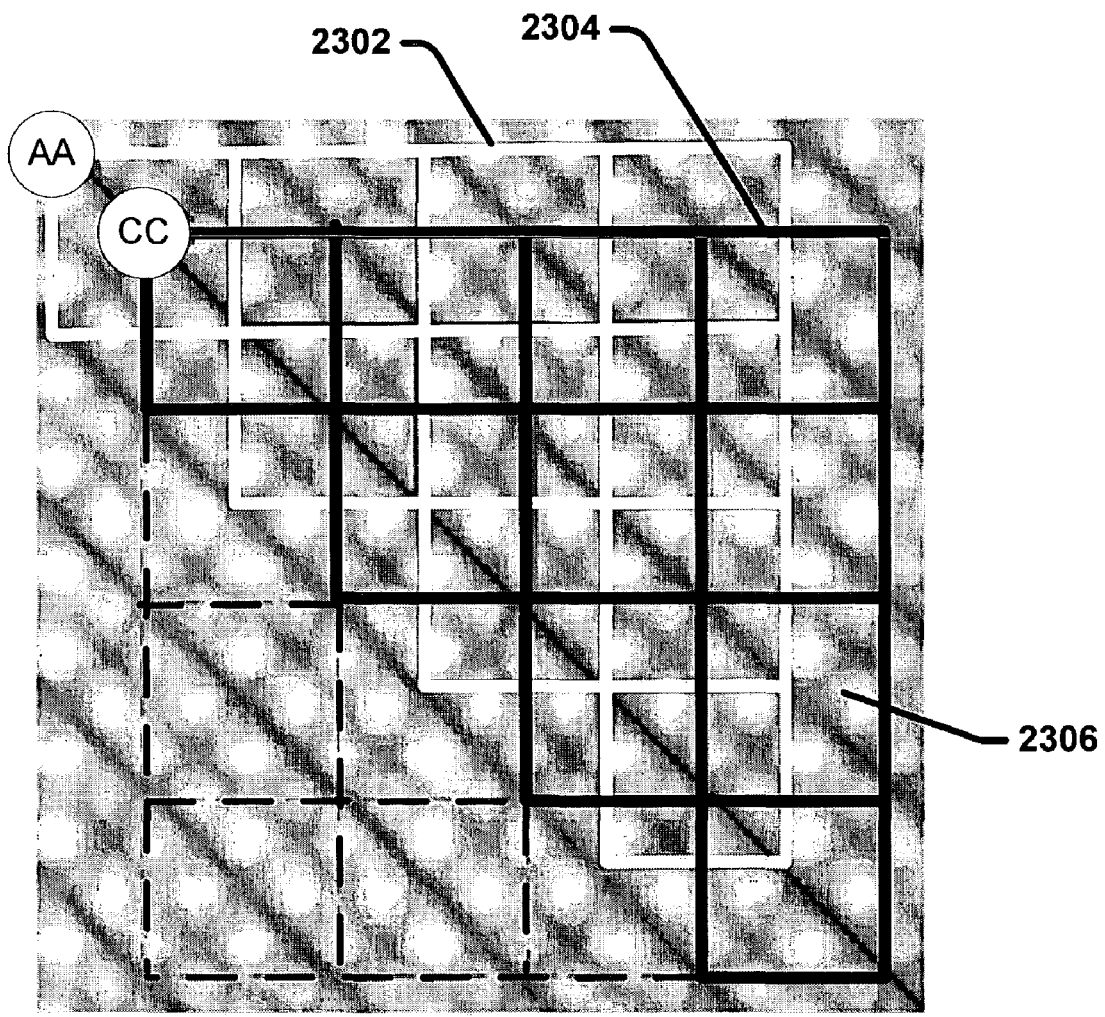
FIG. 23 shows the application of units of self-similarity to a self-similarity plot.

FIG. 23 shows the formation of a collection of self-similarity units (SSU's) on an SSP. Each SSU, such as exemplary SSU 2306, defines a sub-matrix of the SSP that starts at a defined phase in the sequence of templates and spans one gait cycle. The SSP can thus be viewed as a tiling of (contiguous) SSU's. A different tiling can be obtained by selecting a different starting phase. FIG. 23 shows the use of SSU's corresponding to the left and right double-support poses for gait recognition (e.g., defined by lines 2302 and 2304). Because the SSP is approximately symmetric, and to expedite analysis, the method 2000 only uses the SSU's from the top half of the SSP (or the bottom half), as shown in FIG. 23 (that is, the upper triangular matrix of the SSP or the lower triangular matrix). For a sequence containing K gain cycles, there are $$2\frac{k(K+1)}{2} = K(K+1)$$

potential SSU's. The SSU's constitute discrete chunks of information that encapsulate information regarding the subject's gait, and are the counterpart to the discrete model-based features extracted in methods 400 and 1000.

Substep 2018 in FIG. 20 entails the extraction of features from the self-similarity information and the normalization of such features. The extraction of features can involve extracting gait frequency and phase via analysis of the SSP, which, as mentioned above, inherently encodes this information in its patterns. That is, substep 2108 applies an autocorrelation method on the SSP. This technique first smoothes the autocorrelation matrix of the SSP, computes its peaks, and then finds the best-fitting regular 2D lattice for these peaks. The period is then obtained as the width of this best-fitting lattice. The phase is computed by locating the local minima of the SSP that correspond to the A and C poses (depicted in FIGS. 21 and 22). The above-described extracted information can assist in defining the boundaries of the SSU's described above.

The objective of normalization is to equalize different attributes of the SSU's to facilitate effective comparison of such information in the classification step 2006. More specifically, in any pattern classifier, it is useful to determine which sources of variation in the input data are irrelevant to classification, and extract the influence of such sources via normalization prior to classification. In the present case, an SSU of the same walking subject will vary with at least: (i) clothing; (ii) the background scene; (iii) number of pixels on target; (iv) camera viewpoint; and (v) walking speed. It is useful to attempt to neutralize one or more of these factors prior to classification so that the classification results are not unduly influenced by these factors. Normalization can also include scaling the SSU's to a fixed size, etc.

The SSU output of the feature extraction general step 2004 contains a wealth of information regarding the characteristics of the walking subject. However, this information set may be too large to perform effective classification on. Hence, the classification step 2006 can include a substep 2020 of reducing the amount of information presented to it from the feature extraction step 2004. Different techniques are available for performing this data reduction. In one technique, principal component analysis is performed to analyze the features identified by the feature extraction step 2004 to identify a reduced set of information that best characterizes the behavior of the walking subject. The principal component analysis effectively translates a collection of features from a first "space" to a smaller second "space." In other words, the second space has a smaller "dimension" than the first space. Because the features in the second space have been selected for their descriptive merit, these features are analogous to the mathematical concept of eigenvalues; accordingly, the space that contains such salient features can be informally referred to as a kind of "eigengait" space. Principal component analysis is well known in the art, and is described in an image processing context in, for example, M. Turk and A. Pentland, "Face Recognition Using Eigenfaces," in CVPR, 1991.

Finally, substep 2022 determines the identify of a subject under consideration by comparing the reduced feature set with prior stored feature sets pertaining to a plurality of different subjects. Any kind of pattern recognition technique can be used to perform this task, such as, but not limited to, K nearest neighbor analysis. In the context used here, each SSU can be represented as a d-dimensional vector by concatenating its m rows. The distance between two SSU's can then simply be computed as their Euclidean distance in this space to determine whether vector under consideration is a good match for previously stored vectors.

A method for identifying an ambulatory subject based on video analysis of the subject's gait is described. The method includes: (a) acquiring a sequence of images that collectively captures the gait of the subject; (b) extracting a series of depictions of the ambulatory subject from a larger body of image information contained within the sequence of images; (c) determining a self-similarity plot based on the extracted series of depictions; (d) determining a series of self-similarity units within the self-similarity plot, the self-similarity units associated with one gait cycle of the subject's ambulatory motion; and identifying the subject based on the self-similarity units.

The above-described method further includes determining relevant features associated with the self-similarity units, where the identifying the subject based on the self-similarity units includes identifying the subject based on the determined relevant features. The above-mentioned determining of relevant features includes performing principal component analysis to identify the relevant features. The above-mentioned identifying includes performing K nearest neighbor analysis to determine the identity of the subject.

A related apparatus and computer-readable medium for implementing the above method are also described.

E. Techniques for Recognizing Subjects Combining Parametric and Holistic Approaches The above-described classification techniques used either a parametric-based approach or a holistic based approach, but not both. This section describes exemplary ways in which parametric analysis can be combined with holistic analysis to potentially enhance the accuracy of gait recognition.

Figure 24:
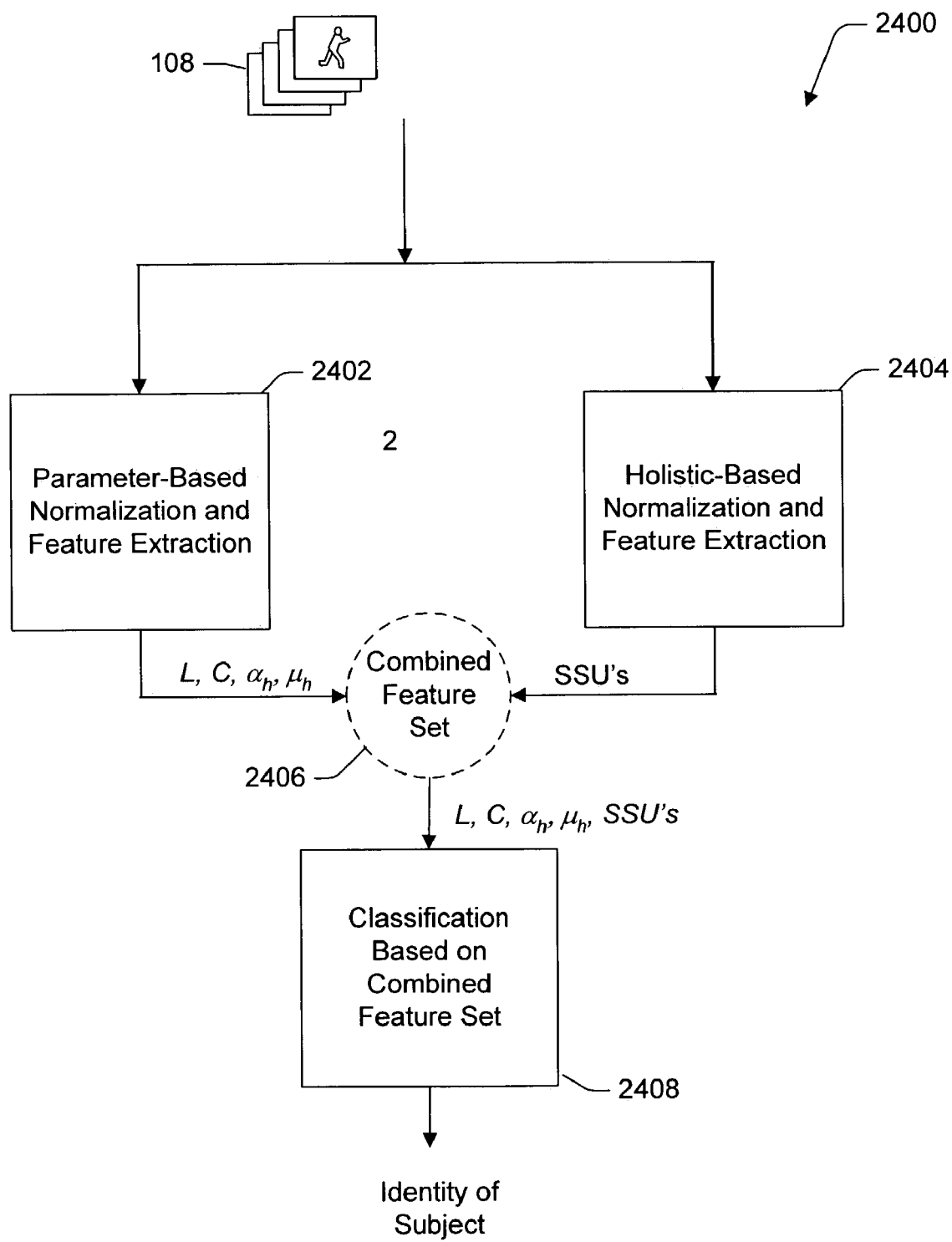
FIG. 24 presents a technique for identifying the subject using an integration of the parametric-based approach and the holistic approach.

FIG. 24 represents one such method 2400 for combining parametric analysis with holistic analysis. This method 2400 involves a step 2402 of extracting and normalizing a set of features based on a model-based parametric approach. (Note that the preprocessing operations that precede the feature extraction operation have been omitted from FIG. 24 to simplify the discussion). An exemplary output of step 2402 can consist of parameters describing stride length (L), cadence (C), and height ($\alpha_h, \mu_h$), etc. The method 2400 also involves a step 2404 of extracting and normalizing a set of features based on a holistic approach. An exemplary output of the step 2404 can consist of a collection of SSU's contained within an SSP.

Step 2406 generally represents the combination of the features provided by steps 2402 and 2404. In the example presented in FIG. 24, the output of step 2406 can consist of the features of L, C, $\alpha_h$, $\mu_h$, and a collection of SSU's.

Step 2408 performs pattern recognition based on the set of features supplied to it by step 2406. Any kind of classification strategy can be used in step 2408, such as the K nearest neighbor approach.

Figure 25:
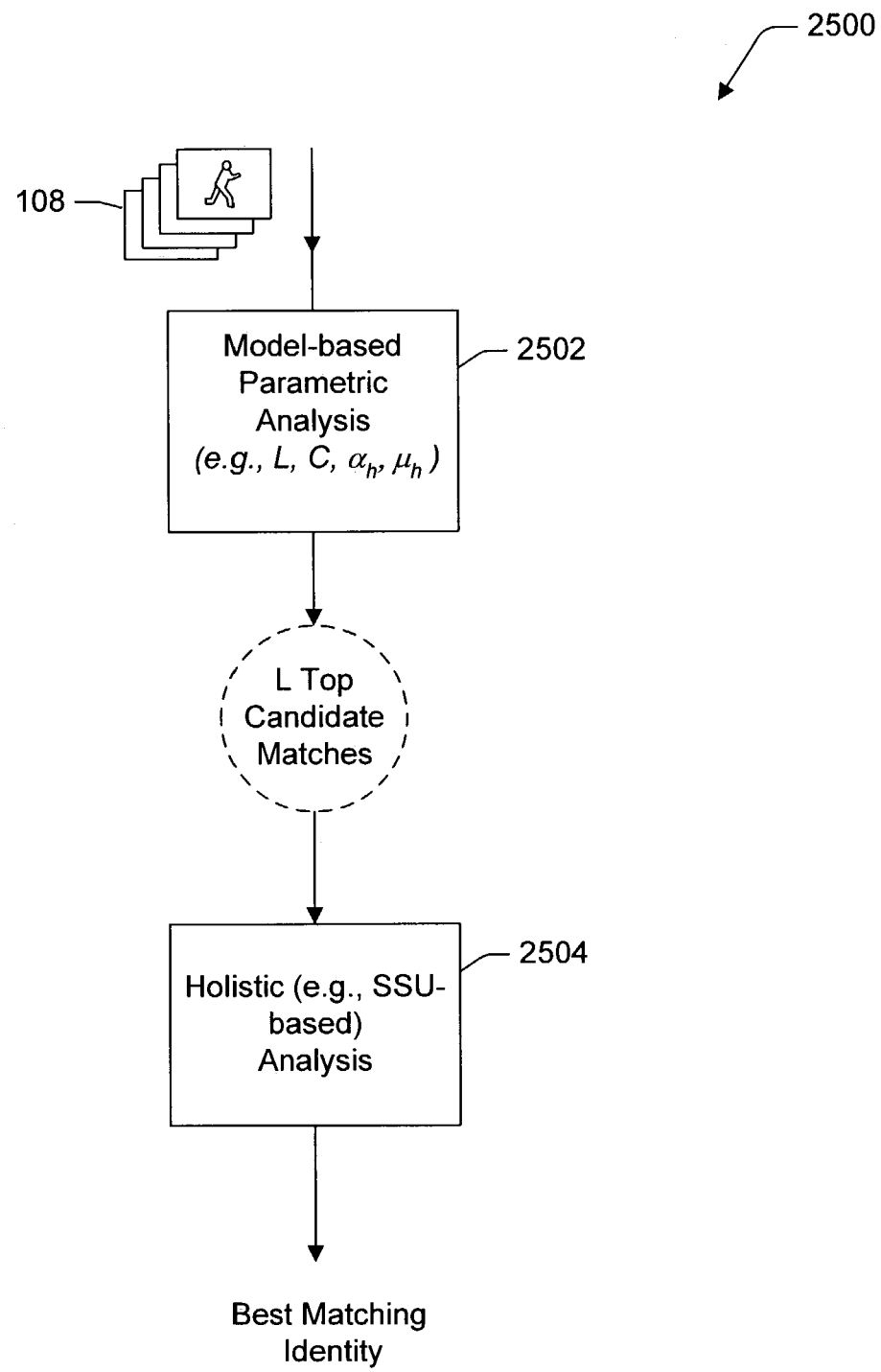
FIG. 25 presents another technique for identifying the subject using an integration of the parametric-based approach and the holistic approach.

FIG. 25 shows another method 2500 for combining parametric analysis with holistic analysis. This method 2500 includes a step 2502 for using parametric analysis to identify a list of L likely matches between a subject under consideration and subject's previously registered in the knowledgebase of the pattern recognizer. Step 2504 performs holistic analysis on data associated with the list of L potential candidates to select a most closely matching candidate. For example, by extracting the cadence, stride length, and height parameters, step 2502 can identify a list of 10 potential candidates that might match the identity of an ambulatory subject under consideration. Then, by using SSP analysis, step 2504 can reexamine the data associated with the 10 candidates to identify the candidate that most closely matches the subject under consideration.

In another implementation, the roles of the parametric analysis and holistic analysis are reversed from that shown in FIG. 25. In this case, holistic analysis can be used to identify a list of L potential candidates, and parametric-based analysis can be used to select the best candidate from this list.

In summary, according to one exemplary implementation, a method is described for identifying an ambulatory subject based on video analysis of the subject's gait. The method includes: (a) acquiring a sequence of images that collectively captures the gait of the subject; (b) determining at least one of the following parametric-derived features from the sequence of images: (i) cadence of gait; (ii) stride length of gait, and (iii) height of the subject; (c) determining a self-similarity plot based on the sequence of images to provide at least one holistic-derived feature; and (d) identifying the subject based on the at least one parametric-derived feature and the at least one holistic-derived feature.

A related apparatus and computer-readable medium for implementing the above method are also described.

According to another exemplary implementation, a method is described for identifying an ambulatory subject based on video analysis of the subject's gait. The method includes: (a) acquiring a sequence of images that collectively captures the gait of the subject; (b) determining at least one parametric-derived feature from the sequence of images; (c) identifying a group of individuals that have a prescribed probability of matching the identity of the subject based on the at least one parametric-derived feature; and (d) performing holistic gait analysis to determine a candidate in the group of individuals having the greatest assessed probability of matching the subject.

A related apparatus and computer-readable medium for implementing the above method are also described.

Still other variations on the above-described design strategy are possible.

In conclusion, although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

The invention claimed is:

1. A method for determining height parameters that describe a dynamically varying height of an ambulatory subject based on video analysis of the subject, comprising:

acquiring a sequence of images that collectively captures a gait of the subject, wherein the gait comprises cadence and stride length;

computing cadence, wherein C=120×frames in seconds/T, C=cadence, T=period of the subject's gait in frames per cycle;

computing stride length, wherein L=W/n/T, L=stride length in meters, W=distance traveled along a path in meters, n=number of frames used in performing analysis, T=period of the subject's gait in frames per cycle and n/T=number of gait cycles that subject traverses over n frames;

measuring a dynamically varying height function of the subject based on an analysis of the varying height of the subject in the sequence of images;

fitting the dynamically varying height function of the subject to a model that describes varying height; and identifying the subject based on the gait and the height;

wherein the height parameters correspond to parameters used in the model.

2. A method according to claim 1, wherein the model represents an ideal variance in height as a sinusoidal function.

3. A method according to claim 1, wherein the parameters used in the model include a first parameter that describes a baseline height value exhibited by a person in ambulatory motion, and a second value that describes a maximum deviation from the baseline height value.

4. A method according to claim 1, wherein the measuring of the dynamically varying height function includes:
   extracting a series of depictions of the ambulatory subject from a larger body of image information contained within the sequence of images;
   defining a series of bounding boxes that enclose respective depictions; and
   for each of the depictions, determining a distance between a point midway between the feet of the subject and a top of the depiction's associated bounding box.

5. An apparatus for determining height parameters that describe a dynamically varying height of an ambulatory subject based on video analysis of the subject, comprising:
   logic configured to acquire a sequence of images that collectively captures the gait of the subject, wherein the gait comprises cadence and stride length;
   logic configured to compute cadence, wherein C=120× frames in seconds/T, C=cadence, T=period of the subject's gait in frames per cycle;
   logic configured to compute stride length, wherein L=W/n/T, L=stride length in meters, W=distance traveled along a path in meters, number of frames used in performing analysis, T=period of the subject's gait in frames per cycle and n/T=number of gait cycles that subject traverses over n frames;
   logic configured to measure a dynamically varying height function of the subject based on an analysis of the varying height of the subject in the sequence of images; and
   logic configured to fit the dynamically varying height function of the subject to a model that describes varying height,
   wherein the height parameters correspond to parameters used in the model.

6. An apparatus according to claim 5, wherein the model represents an ideal variance in height as a sinusoidal function.

7. An apparatus according to claim 5, wherein the parameters used in the model include a first parameter that describes a baseline height value exhibited by a person in ambulatory motion, and a second value that describes a maximum deviation from the baseline height value.

8. An apparatus according to claim 5, wherein the logic configured to measure the dynamically varying height function includes:
   logic configured to extract a series of depictions of the ambulatory subject from a larger body of image information contained within the sequence of images;
   logic configured to define a series of bounding boxes that enclose respective depictions; and
   logic configured to, for each of the depictions, determine a distance between a point midway between the feet of the subject and a top of the depiction's associated bounding box.

9. A computer-readable storage media having processor-executable instructions, that when executed on a computing device, direct a computing system to:
   generate a sequence of images that collectively captures a gait of the subject, wherein the gait comprises cadence and stride length;
   compute cadence, wherein C=120×frames in seconds/T, C=cadence, T=period of the subject's gait in frames per cycle;
   compute stride length, wherein L=W/n/T, L=stride length in meters, W=distance traveled along a path in meters, n=number of frames used in performing analysis, T=period of the subject's gait in frames per cycle and n/T=number of gait cycles that subject traverses over n frames;
   measure a dynamically varying height function of the subject based on an analysis of the varying height of the subject in the sequence of images;
   analyze the dynamically varying height function of the subject to a model that describes varying height, wherein one or more height parameters correspond to parameters used in the model;
   extract the one or more height parameters associated with the gait of the subject;
   compare the extracted one or more height parameters associated with the gait of the subject to identified gait information corresponding to individuals; and
   identify the subject based on the gait of the subject.

10. The computer-readable storage media according to claim 9, further comprising computer-executable instructions that, when executed, direct the computing system to:
    extract a series of depictions of the ambulatory subject from a larger body of image information contained within the sequence of images;
    define a series of bounding boxes that enclose respective depictions; and
    for each of the depictions, determine a distance between a point midway between the feet of the subject and a top of the depiction's associated bounding box.

11. The computer-readable storage media according to claim 9, wherein the parameters used in the model include a first parameter that describes a baseline height value exhibited by a person in ambulatory motion, and a second value that describes a maximum deviation from the baseline height value.

12. One or more computer-readable storage media comprising computer-executable instructions that, when executed, perform the method as recited in claim 1.

13. A method according to claim 1, wherein acquiring the sequence of images comprises a fronto-parallel orientation.

14. A method according to claim 1, wherein fitting the dynamically varying height function of the subject to the model comprises real-time analysis of the subject's gait in a real-time mode.

15. A method according to claim 4, wherein extracting a series of depictions of the ambulatory subject comprises a cadence of gait and a stride length of gait.

16. A method according to claim 15, wherein the stride length is measured by:
  determining a length of distance traversed by the subject and the number of steps that the subject took to traverse the distance, and computing the stride length based on the length of distance traversed and the number of steps.

17. A method according to claim 15, wherein the cadence and the stride length are related to each other by a linear function; and
  identifying the subject based on the subject's cadence, stride length, and based on the linear function used to relate cadence with stride length.

18. A method according to claim 1, further comprising:
  extracting at least one of the following parametric-derived features from the sequence of images:
  cadence of gait;
  stride length of gait,
  height of the subject;
  determining a self-similarity plot based on the sequence of images to provide at least one holistic-derived feature; and
  identifying the subject based on the at least one parametric-derived feature and the at least one holistic-derived feature.

19. One or more computer-readable storage media comprising computer-executable instructions that, when executed, perform the method as recited in claim 17.

20. One or more computer-readable storage media comprising computer-executable instructions that, when executed, perform the method as recited in claim 18.

* * * * *

UNITED STATES PATENT AND TRADEMARK OFFICE
CERTIFICATE OF CORRECTION

| | | |
|---|---|---|
| PATENT NO. | : 7,330,566 B2 | Page 1 of 1 |
| APPLICATION NO. | : 10/611657 | |
| DATED | : February 12, 2008 | |
| INVENTOR(S) | : Ross G. Cutler | |

It is certified that error appears in the above-identified patent and that said Letters Patent is hereby corrected as shown below:

In column 23, line 50, in Claim 5, after "meters," insert --n=--.

Signed and Sealed this

Twenty-second Day of February, 2011

David J. Kappos
*Director of the United States Patent and Trademark Office*